United States Patent
Ogura

(10) Patent No.: US 12,010,284 B2
(45) Date of Patent: *Jun. 11, 2024

(54) IMAGE FORMING APPARATUS, METHOD OF STORING IMAGE FORMING DATA IN USB MEMORY WHEN A PARTICULAR STORING FUNCTION IS ENABLED, AND NON-TRANSITORY COMPUTER-READABLE RECORDING MEDIUM THEREFOR

(71) Applicant: Brother Kogyo Kabushiki Kaisha, Nagoya (JP)

(72) Inventor: Sho Ogura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,561

(22) Filed: Dec. 5, 2022

(65) Prior Publication Data

US 2023/0114219 A1 Apr. 13, 2023

Related U.S. Application Data

(63) Continuation of application No. 16/885,452, filed on May 28, 2020, now Pat. No. 11,523,028.

(30) Foreign Application Priority Data

May 31, 2019 (JP) ................. 2019-102161

(51) Int. Cl.
*G06F 3/12* (2006.01)
*H04N 1/44* (2006.01)
(Continued)

(52) U.S. Cl.
CPC ......... *H04N 1/4433* (2013.01); *G06F 3/1204* (2013.01); *G06F 3/1238* (2013.01);
(Continued)

(58) Field of Classification Search
None
See application file for complete search history.

(56) References Cited

U.S. PATENT DOCUMENTS

| 5,478,155 A | 12/1995 | Sasaki |
| 9,672,386 B2 | 6/2017 | Takemura |

(Continued)

FOREIGN PATENT DOCUMENTS

| CN | 102547050 A | 7/2012 |
| CN | 106027836 A | 10/2016 |

(Continued)

OTHER PUBLICATIONS

Japanese Office Action (with English translation) dated Feb. 21, 2023 (Application No. 2019-102161).

(Continued)

*Primary Examiner* — Haris Sabah
(74) *Attorney, Agent, or Firm* — Scully, Scott, Murphy & Presser, PC

(57) ABSTRACT

An image forming apparatus is provided with a storage, a controller, an image forming part, a first interface configured to receive an image forming job, and a second interface to which a portable storage device is connectable. When the particular storing function is enabled, image data is stored in the portable storage in response to receipt of the print job, and an image is formed in accordance with the image data stored in the portable storage. When the particular storing function is disabled, the image data related to the print job is stored in the storage of the image forming apparatus in response to receipt of the print job, and an image is formed in accordance with the image data stored in the storage of the image forming apparatus.

11 Claims, 10 Drawing Sheets

(51) Int. Cl.
  *H04N 1/00* (2006.01)
  *H04N 1/21* (2006.01)
(52) U.S. Cl.
  CPC .......... *G06F 3/1274* (2013.01); *G06F 3/1271* (2013.01); *G06F 3/128* (2013.01); *H04N 1/00965* (2013.01); *H04N 1/2137* (2013.01)

(56) References Cited

U.S. PATENT DOCUMENTS

| | | | |
|---|---|---|---|
| 11,290,616 B2* | 3/2022 | Ogura | G06F 3/1238 |
| 2006/0070070 A1 | 3/2006 | Iwamoto | |
| 2007/0086036 A1 | 4/2007 | Tanaka | |
| 2008/0123135 A1 | 5/2008 | Inoue | |
| 2008/0127307 A1* | 5/2008 | Fukuta | H04N 1/4433 |
| | | | 726/3 |
| 2008/0158602 A1 | 7/2008 | Nakai | |
| 2008/0191010 A1 | 8/2008 | Fujinaga | |
| 2008/0297849 A1 | 12/2008 | Fukasawa | |
| 2009/0097050 A1 | 4/2009 | Yoshida | |
| 2010/0054467 A1 | 3/2010 | Cho | |
| 2011/0096363 A1 | 4/2011 | Chiba et al. | |
| 2011/0255133 A1* | 10/2011 | Pastor | G06K 15/4005 |
| | | | 358/1.16 |
| 2014/0071485 A1 | 3/2014 | Ito | |
| 2014/0126012 A1 | 5/2014 | Chung et al. | |
| 2015/0009531 A1 | 1/2015 | Kawaguchi | |
| 2015/0153696 A1* | 6/2015 | Oya | G03G 15/556 |
| | | | 399/82 |
| 2016/0072971 A1* | 3/2016 | Ozaki | H04N 1/00413 |
| | | | 358/1.15 |
| 2016/0286086 A1 | 9/2016 | Ohata | |
| 2016/0295033 A1 | 10/2016 | Hirasawa | |

FOREIGN PATENT DOCUMENTS

| | | |
|---|---|---|
| EP | 3 174 273 A1 | 5/2017 |
| JP | H06-278328 A | 10/1994 |
| JP | 2000-099291 A | 4/2000 |
| JP | 2003-136788 A | 5/2003 |
| JP | 2003-319119 A | 11/2003 |
| JP | 2006-049956 A | 2/2006 |
| JP | 2006-101194 A | 4/2006 |
| JP | 2007-081541 A | 3/2007 |
| JP | 2007-110518 A | 4/2007 |
| JP | 2008-093903 A | 4/2008 |
| JP | 2009-059274 A | 3/2009 |
| JP | 2009-070024 A | 4/2009 |
| JP | 2009-160832 A | 7/2009 |
| JP | 2009-182652 A | 8/2009 |
| JP | 2017-205876 A | 11/2017 |
| JP | 2019-075157 A | 5/2019 |

OTHER PUBLICATIONS

Japanese Office Action (with English translation) dated May 16, 2023 (Application No. 2019-102161).
Official Action dated Feb. 1, 2024 received from the China National Intellectual Property Administration in related application CN 202010473810.4 together with English language transaltion.

* cited by examiner

| JOB NAME | USER NAME | RECEIVED DATE & TIME | IMAGE DATA NAME |
|---|---|---|---|
| JOB1 | USER1 | 2019/5/1 9:00:00 | data0001 |
| JOB2 | USER1 | 2019/5/1 9:05:00 | data0002 |
| JOB3 | USER1 | 2019/5/1 9:10:00 | data0003 |
| JOB4 | USER2 | 2019/5/1 9:20:00 | data0004 |
FIG. 2
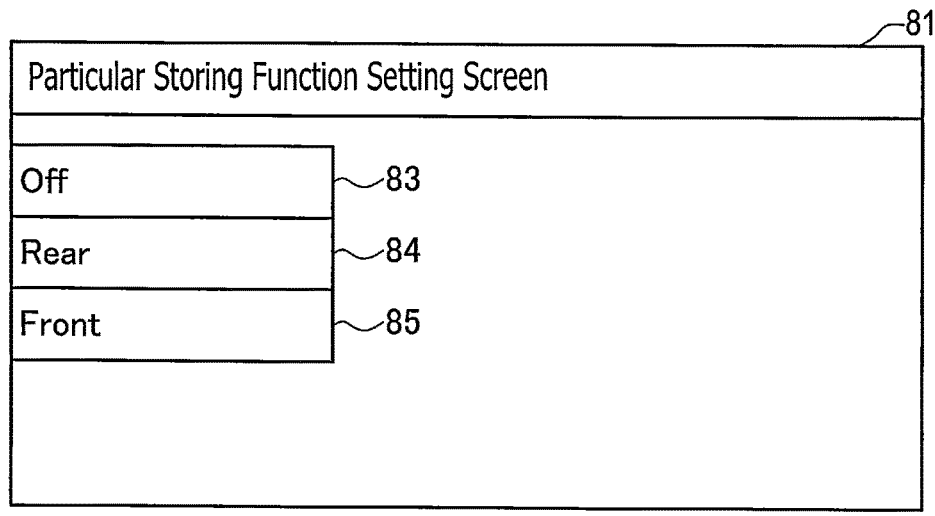
FIG. 3
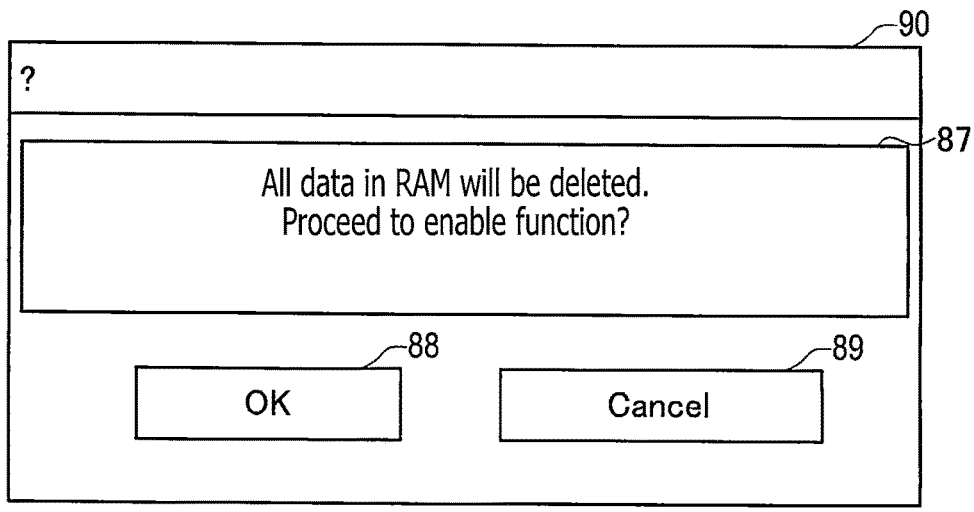
FIG. 4

IMAGE FORMING APPARATUS, METHOD OF STORING IMAGE FORMING DATA IN USB MEMORY WHEN A PARTICULAR STORING FUNCTION IS ENABLED, AND NON-TRANSITORY COMPUTER-READABLE RECORDING MEDIUM THEREFOR

CROSS-REFERENCE TO RELATED APPLICATIONS

This application is a continuation application of U.S. patent application Ser. No. 16/885,452, filed May 28, 2020, and claims priority under 35 U.S.C. § 119 from Japanese Patent Application No. 2019-102161 filed on May 31, 2019, the entireties of which are incorporated herein by reference.

BACKGROUND

Technical Field

The present disclosures relate to an image forming apparatus configured to store image forming data in a portable storage device, a method of storing image forming data, and a non-transitory computer-readable recording medium therefor.

Related Art

Conventionally, various image forming apparatuses have been proposed that are configured to receive a job related to image formation and store image data corresponding to the received job in a portable storage device such as a USB memory connected to the image forming apparatus. For example, there is known a printer in which, when print data is received together with a specific print instruction (e.g., an instruction for multiple copy printing, authentication printing, electronic sort printing, etc.), it is determined that print data to be stored in the USB memory is input, while, when the printer receives print data together with another print instruction different from the specific print instruction, it is determined that print data to be stored in the USB memory is not input.

SUMMARY

In the above conventional technique, whether or not the printer stores the print data in the USB memory connected to the printer is determined based only on the content of the print instruction received together with the print data. That is, in such a printer, it is impossible to determine whether or not to store the print data in the connected USB memory independently of the content of the print instruction, which may lower usability of the printer.

It has been desired that there is provided an improved image forming apparatus in which enhanced convenience is achieved. It has also been desired that a method of storing image forming data, and a non-transitory computer-readable recording medium storing instructions for the image forming apparatus are provided.

According to aspects of the present disclosures, there is provided an image forming apparatus which is provided with a storage, a controller, an image forming part, a first interface configured to receive an image forming job, and a second interface to which a portable storage device is connectable. The controller is configured to perform a receiving process of receiving an operation of one of enabling and disabling a particular storing function which is a function to store image data related to the print job in the portable storage, an enabling process of enabling the particular storing function in response to the controller receiving the operation of enabling the particular storing function in the receiving process, a disabling process of disabling the particular storing function in response to the controller receiving the operation of disabling the particular storing function in the receiving process, a first storing process of storing the image data related to the print job in the portable storage in response to receipt of the print job when the particular storing function is enabled in the enabling process, a first image forming process of forming an image with the image forming part in accordance with the image data stored in the portable storage in the first storing process, a second storing process of storing the image data related to the print job in the storage of the image forming apparatus in response to the controller receiving the print job when the particular storing function is disabled in the disabling process, and a second image forming process of forming an image with the image forming part in accordance with the image data stored in the storage of the image forming apparatus in second storing process.

According to aspects of the present disclosures, there is provided a method of storing image forming data employed in an image forming apparatus provided with a storage, an image forming part, a first interface configured to receive an image forming job, and a second interface to which a portable storage device is connectable. The method includes receiving an operation of one of enabling and disabling a particular storing function which is a function to store image data related to the print job in the portable storage, enabling the particular storing function in response to receipt of the operation of enabling the particular storing function, disabling the particular storing function in response to receipt of the operation of disabling the particular storing function, storing the image data related to the print job in the portable storage in response to receipt of the print job when the particular storing function is enabled, forming an image with the image forming part in accordance with the image data stored in the portable storage, storing the image data related to the print job in the storage of the image forming apparatus in response to receipt of the print job when the particular storing function is disabled, and forming an image with the image forming part in accordance with the image data stored in the storage of the image forming apparatus.

According to aspects of the present disclosures, there is provided a non-transitory computer-readable recording medium for an image forming apparatus provided with a storage, a controller, an image forming part, a first interface configured to receive an image forming job, and a second interface to which a portable storage device is connectable. The non-transitory computer-readable recording medium storing instructions which cause, when executed by the controller, the image forming apparatus to perform a receiving process of receiving an operation of one of enabling and disabling a particular storing function which is a function to store image data related to the print job in the portable storage, an enabling process of enabling the particular storing function in response to the controller receiving the operation of enabling the particular storing function in the receiving process, a disabling process of disabling the particular storing function in response to the controller receiving the operation of disabling the particular storing function in the receiving process, a first storing process of storing the image data related to the print job in the portable storage in response to receipt of the print job when the particular storing function is enabled in the enabling process, a first image forming process of forming an image with the image forming part in accordance with the image data stored in the portable storage in the first storing process, a second storing process of storing the image data related to the print job in the storage of the image forming apparatus in response to the controller receiving the print job when the particular storing function is disabled in the disabling process, and a second image forming process of forming an image with the image forming part in accordance with the image data stored in the storage of the image forming apparatus in second storing process.

BRIEF DESCRIPTION OF THE ACCOMPANYING DRAWINGS

FIG. 1 is a block diagram showing an electrical configuration of an MFP.

FIG. 2 schematically shows data stored in list data.

FIG. 3 shows a setting screen for setting a particular storing function.

FIG. 4 shows a confirmation screen for confirming deletion of data in a RAM.

DETAILED DESCRIPTION OF THE EMBODIMENT

Figure 1:
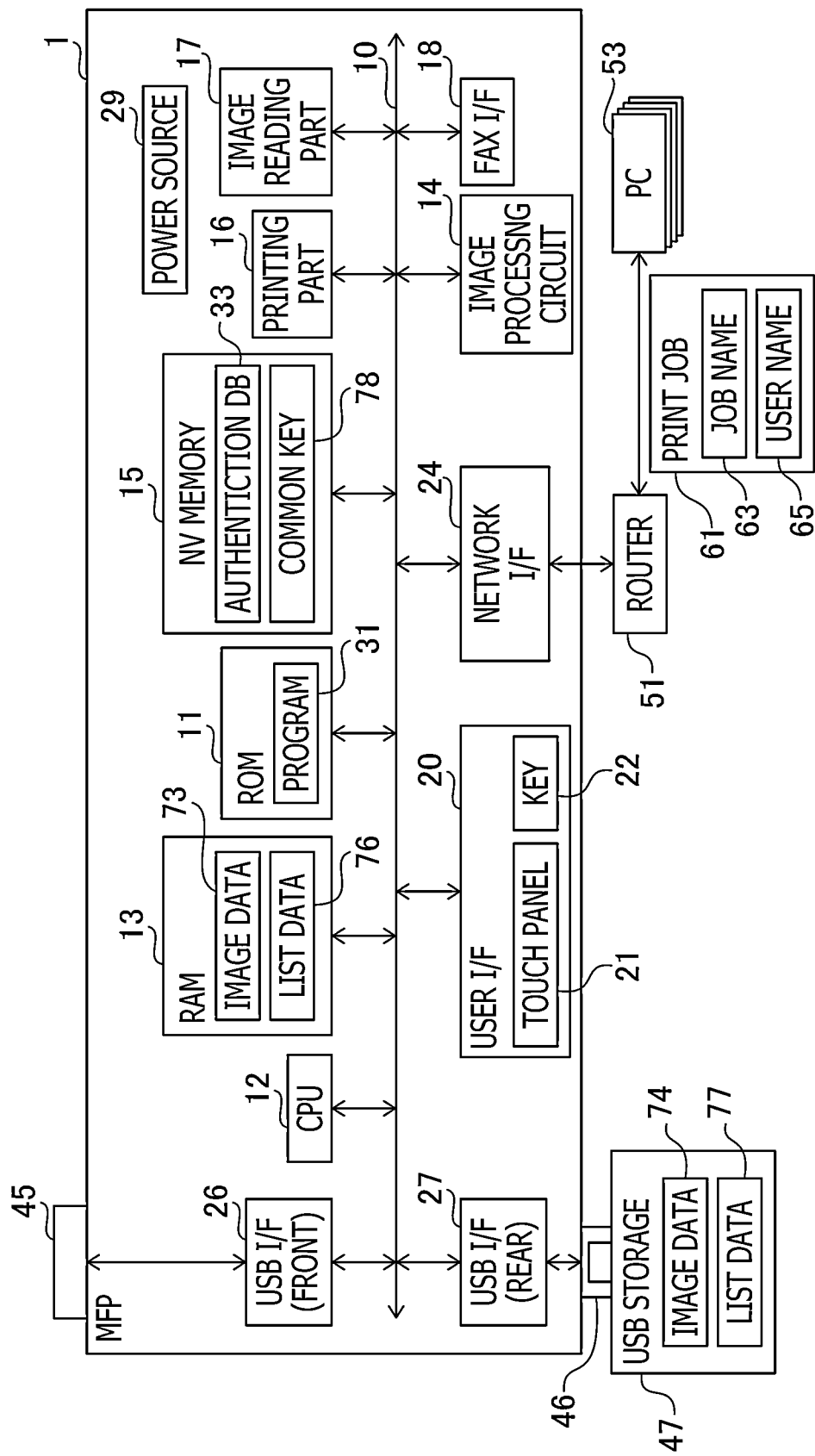

Referring to FIG. 1, an MFP 1 according to an embodiment of the present disclosures will be described.

1. Configuration of MFP

FIG. 1 is a block diagram showing an electric configuration of the MFP 1. The MFP 1 is a multifunctional device equipped with a printing function, a copying function, a scanner function and a facsimile function. As shown in FIG. 1, the MFP 1 includes a ROM 11, a CPU 12, a RAM 13, an image processing circuit 14, a non-volatile memory 15, a printing part 16, an image reading part 17, a facsimile interface (FAX I/F) 18, a user interface (user I/F) 20, a network interface (network I/F) 24, a front side USB interface (USB I/F) 26, a rear side USB OF 27, and the like. The above components (i.e., the CPU 12 and the like) are connected to each other through a bus 10. The MFP 1 is further provided with a power source 29 which receives power from a commercial power supply. The power source 29, which includes a power cord and a power supply circuit (e.g., bridge diodes, a smoothing circuit, etc.), is configured to generate a direct current power source from a commercial power source, and supplies electrical powers to respective components provided to the MFP 1 through power lines.

The ROM 11 stores a plurality of programs 31 to be executed by the CPU 12. The programs 31, for example, cause, when executed, the CPU 12 to integrally control respective parts of the MFP 1. The CPU 12 is configured to execute the program 31 loaded from the ROM 11 to the RAM 13, and control the respective parts connected through the bus 10 while temporarily storing results of executed processes in the RAM 13. The programs 31 include an EWS (Embedded Web Server) program that functions as a web server. The CPU 12 causes the MFP 1 to function as the web server by executing the EWS program. It is noted that the storage device storing the programs 31 is not limited to the ROM, but may be an HDD, a NVRAM, a flash memory, or a combination thereof.

The non-volatile memory 15 is configured to store and hold data in a rewritable manner, and an EEPROM, an NVRAM, a flash memory and/or an HDD may be employed as the non-volatile memory 15. An authentication DB 33 is stored in the non-volatile memory 15. The authentication DB 33 is a database in which data of user names and login passwords of respective users who can log in to the MFP 1 are stored in an associated manner. Each user performs a login operation to log in to the MFP 1 using the user name and login password registered with the authentication DB 33. The MFP 1 according to the present embodiment is configured to allow edition of the authentication DB 33 by the user through a web server which runs as the EWS program is executed by the CPU 12. It is noted that a method of allowing edition of the authentication DB 33 is not limited to the method using the web server as described above, but may be, for example, a method of allowing the edition by the user through the user OF 20.

In the following description, the MFP 1 in which the programs 31 are executed by the CPU 12 may be simply referred to by a device name. For example, an expression "the MFP 1 receives an input operation with respect to the touch panel 21" may mean "the MFP 1 accepts an input operation with respect to the touch panel 21 as the CPU 12 executes the programs 31 to control the touch panel 21 so that an input operation by the user on the touch panel 21 is detected."

The image processing circuit 14 is a circuit configured to perform processing, developing and the like of image data relating to a print job, a scan job and the like. The printing part 16 includes a print engine configured to form an image represented by image data on a sheet (e.g., a printing paper, an OHP sheet or the like), and the print engine according to the present embodiment includes an inkjet head. It is noted that, instead of the inkjet print engine described above, the print engine may be an electrophotographic print engine provided with an exposure device, a photosensitive member and the like, or may be a thermal print engine having a thermal head and the like.

The image reading part 17 has a reading sensor configured to read an image on an original. As the reading sensor, a CCD (Charge Coupled Devices), a CIS (Contact Image Sensor) or the like can be adopted. The image reading part 17 is configured to move the reading sensor relative to the original placed on an original table, read an image on the original, and generate image data representing the read image. The FAX I/F 18 is configured to transmit FAX data to other facsimile device and/or receive the FAX data from other facsimile device, (i.e., at least one of transmit and receive) via a telephone line.

The user I/F 20 includes a touch panel 21 and a keyboard 22. The touch panel 21 includes, for example, a liquid crystal panel, a light source such as an LED for irradiating light from a rear surface side of the liquid crystal panel, and a touch sensing film bonded to the surface of the liquid crystal panel. The keyboard 22 has a plurality of operation buttons/keys. The user I/F 20 is configured to display, for example, various setting screens, operating states of the device and the like on the touch panel 21 under control of the CPU 12. In addition, the user I/F 20 is configured to transmit signals corresponding to operations, by the user, on the touch panel 21 and of the keyboard 22 to the CPU 12. According to the present embodiment, the MFP 1 includes the touch panel 21 serving as both a displaying part and an operation part. However, the configuration of the user I/F 20 do not need to be limited to such a configuration, but a hardware keyboard, for example, may be provided as the operation part separately from the displaying part.

A network I/F 24 is, for example, a LAN (Local Area Network) I/F, and is connected to a router 51 via LAN cables (not shown). According to the present embodiment, a plurality of PCs 53 are connected to the router 51. The user can transmit a print job 61 (an example of an image forming job) from one of the PCs 53 to the MFP 1 by operating the PC 53. Then, the MFP 1 executes a print process based on the print job 61 received from the PC 53. The print job processed by the MFP 1 does not need to be limited to the print job received from the PC 53, but may be, for example, a print job received from a mail server in an e-mail format. Further, the image forming job according to the present embodiment does not need to be limited to a print job for instructing printing, but may be, for example, a FAX job for instructing a FAX transmission. The network connecting the MFP 1 and the PC 53 does not need to be limited to a wired LAN, but the network may be, for example, a wireless LAN or a WAN (including the Internet).

The front side USB I/F 26 and the rear side USB I/F 27 (examples of the second I/F) are interfaces configured to perform communication and power transfer in accordance with, for example, a USB (Universal Serial Bus) standard. The USB standard does not need to be limited to a particular one, and USB 2.0 standard, USB 3.0 standard or the like can be adopted as the USB standard. Further, the second I/F according to the present embodiment does not need to be limited to the USB I/F, but an interface according to another standard such as IEEE 1394 standard can be adopted. Alternatively, a radio communication I/F such as the NFC (Near Field Communication) or the Bluetooth (registered trademark) can be adopted as the second I/F. In this case, a portable storage device such as a portable terminal device or a hard disk drive may be connected to the MFP 1 by radio (i.e., wirelessly).

The front side USB I/F 26 is connected to a front side USB port 45 provided to the front side of the MFP 1. Similarly, the rear side USB I/F 27 is connected to a rear side USB port 46 provided to the rear side of the MFP 1. The front side USB port 45 and the rear side USB port 46 are connectors (e.g., receptacles) to which connected devices are to be connected. The front side USB I/F 26 is configured to execute data input and output with respect to the device connected to the front side USB port 45 under the control of the CPU 12. Similarly, the rear side USB I/F 27 is configured to execute data input and output with respect to the device connected to the rear side USB port 46 under the control of the CPU 12.

As shown in FIG. 1, a USB storage 47 is connected to the rear side USB port 46 as a connected device. The USB storage 47 is, for example, a portable storage device such as a USB memory. For another example, the USB storage may be a USB flash drive, a USB flash memory or the like. The portable storage device according to the present embodiment does not need to be limited to a USB memory, but may be an HDD configured to be connected in accordance with a USB connection, a memory card configured to communicate in accordance with a USB-connected card reader, a PC having an HDD, or the like. As connected devices connectable to the front USB port 45 and/or the rear USB port 46, various connected devices such as a keyboard, a fan, a light configured to be connected in accordance with the USB connection can be employed in addition to or instead of the above described portable storage devices.

2. Storage Printing Function and Particular Storing Function

The MFP 1 of the present embodiment has a storage printing function and a particular storing function. The MFP 1 is configured to receive a setting of enabling or disabling the storage printing function from, for example, the web server of the EWS. In addition, the MFP 1 is configured to store a registration value indicating whether the storage printing function is enabled or disabled in the non-volatile memory 15, and manages ON/OFF of the function. In a case where the storage printing function is enabled, when the MFP 1 receives the print job 61 in which the job name 63 and the user name 65 are set, as shown in FIG. 1, from the PC 53, the MFP 1 determines whether or not the user name 65 of the received print job 61 has already been registered in the authentication DB 33. When the user name 65 has been registered in the authentication DB 33, the MFP 1 stores the data related to the received print job 61 to the RAM 13, while when the user name 65 has not been registered in the authentication DB 33, the MFP 1 executes printing of the print job 61. The method of receiving the setting of enabling or disabling of the storage printing function is not limited to the method of using the Web server as described above. As another method, for example, the setting of enabling or disabling of the storage printing function may be received from the user OF 20. Alternatively, the print job 61 may include the setting of enabling or disabling of the storage printing function.

The print job 61 includes, for example, PJL data and PDL data. The PJL data is written in PJL (Printer Job Language) and the PDL data is written in PDL (Page Description Language). The PJL data is, for example, data such as commands for causing the MFP 1 to execute an image forming process and the like. The PDL data is, for example, data of an image used for image formation or data of an image forming instruction. More specifically, the PDL data includes, for example, PS (Post Script) data, PCL (Printer Command Language) data, JPEG (Joint Photographic Experts Group) data, GDI (Graphic Device Interface) data or the like.

The image processing circuit 14 performs a RIP process to rasterize the PDL data included in the print job 61 under control of the CPU 12, and generates rasterized image data 73 (an example of image forming data). The MFP 1 stores the image data 73 generated by the image processing circuit 14 in the RAM 13. When the MFP 1 stores the image data 73 related to the new print job 61 in the RAM 13, the MFP 1 stores information related to the print job 61 in the list data 76 in RAM 13. When the storage printing function is enabled, the MFP 1 stores the image data 73 related to the print job 61 of a user of which user name 65 is registered in the authenticated DB 33 in the RAM 13, and updates the list data 76. The image forming data according to the present disclosures may be rasterized image data or PDL data before rasterization. The storage destination of the image data 73 and the list data 76 does not need to be limited to the RAM 13, but may be, for example, the non-volatile memory 15.

FIG. 2 shows an example of data stored in the list data 76. As shown in FIG. 2, in the list data 76, a job name, a user name, a received date and time and an image data name are associated with each other and registered as one record. The MFP 1 adds a new record to the list data 76 based on the received information of the print job 61, such as the job name 63, the user name 65, and the image data 73. It is noted that, by storing the name of the image data 73 in the list data 76, the MFP 1 is capable of managing respective records of the list data 76 in association with the image data 73 stored in the RAM 13.

When a user name and a password are input through the touch panel 21 while a particular authentication window is displayed on the touch panel 21, the MFP 1 checks input user name and input password against the user name and the password registered in the authentication DB 33 of the non-volatile memory 15, respectively. When the user name and the password coincide with the user name and the password registered in the authenticated DB 33 as a result of the verification, the MFP 1 allows login of the user. The MFP 1 executes printing of the image data 73 associated with the user name of the logging-in user from among a plurality of pieces of the image data 73 stored in the RAM 13. Hereinafter, such printing will occasionally be referred to as storage printing. Further, when the MFP 1 receives the print job 61 from the PC 53 in a case where the storage printing function is disabled, the MFP 1 starts the printing process without storing the received print job 61 in the RAM 13.

The authentication DB 33 used for the login authentication is not necessarily be stored in the non-volatile memory 15. For example, the authentication DB 33 may be stored in a server external to the MFP 1, and the MFP 1 may perform the authentication process with communicating with the server.

The method of storing the print jobs 61 in the MFP 1 does not need to be limited to the method using the above-described authentication DB 33. For example, the printer driver of the PC 53 may set a password to the print job 61. On the MFP 1 side, when the print job 61 is protected by the password, the MFP 1 may store the print job 61 in the RAM 13. Then, the MFP 1 may receive user input of selecting the stored print job 61 and the password via the touch panel 21, and execute printing when the password set to the selected print job 61 and the password input by the user (i.e., received by the MFP 1) coincide with each other.

The particular storing function is, for example, a function of changing a storage destination of the image data 73 when the storage printing function described above is enabled. When the particular storing function is enabled, the image data for the print jobs 61 of the above-described storage printing is stored not in the RAM 13, but in the USB storage 47. The particular storing function is disabled, for example, in the initial state, and the particular storing function becomes changeable between the enabled state and the disabled state after the storage printing function is enabled. When the storage printing function is disabled, the particular storing function is also disabled, for example, in conjunction with disablement of the storage printing function. It is noted that the particular storing function may be configured to be switchable between the enabled state and the disabled state, independently of the state of the storage printing function.

The MFP 1 executes setting of enabling or disabling of the particular storing function based on, for example, the operational input with respect to the touch panel 21, as shown in FIG. 3. Alternatively or optionally, the Web server may be configured to receive a user operation of enabling or disabling of the particular storing function. The MFP 1 is configured to manage ON and OFF of the particular storing function by storing the registration value indicating enabling or disabling of the particular storing function in the non-volatile memory 15.

In a case where the particular storing function is enabled, when the MFP 1 receives the print job 61, in which the job name 63 and the user name 65 are set, from the PC 53, the MFP 1 determines whether or not the user name 65 set to the received print job 61 is registered in the authentication DB 33. When the user name 65 set to the print job 61 is registered in the authentication DB 33, the MFP1 rasterizes PDL data included in the received print job 61 to generate the image data 74 and stores the generated image data 74 in the USB storage 47. When the MFP 1 newly stores the image data 74 for the new print job 61, the MFP 1 stores information related to the print job 61 in the list data 77 stored in the USB storage 47. The list data 77 is, for example, data having the same format as the list data 76.

It is noted that the data in the RAM 13 attached to MFP1 is difficult to be accessed externally. In contrast, browsing the data in the USB storage 4 is possible by detaching the USB storage 47 from the MFP 1 and connecting the same to the PC or the like. In this regard, the MFP 1 according to the present embodiment is configured to encrypt the image data 74 and the list data 77 to be stored in the USB storage 47 when the particular storing function is enabled. As will be described later, the MFP 1 generates a common key 78 to be used for encryption when the particular storing function is enabled, and stores the generated common key 78 in the non-volatile memory 15 (S30 of FIG. 6). A method of generating the common key 78 will be described later. It is noted that a storage destination of the common key 78 is not limited to the non-volatile memory 15, but may be, for example, a RAM 13.

The MFP 1 encrypts the image data 74 using the common key 78 and stores the encrypted image data 74 in the USB storage 47. When the MFP 1 is to perform the storage printing, the MFP 1 retrieves the image data 74 from the USB storage 47, decrypts the same using the common key 78 and executes printing. Further, upon receiving a new print job 61, the MFP 1 retrieves the list data 77 from the USB storage 47, decrypts the list data 77 using the common key 78, and adds the information regarding the new print job 61 to the decrypted list data 77. Thereafter, the MFP 1 encrypts the updated list data 77 using the common key 78 and stores the encrypted list data 77 in the USB storage 47. This is advantageous in view of security since this makes it very difficult to decrypt the image data 74 and the list data 77 stored in the USB storage 47.

Further, in the MFP 1 according to the present disclosures, the USB port used in the particular storing function can be determined by selecting one of two ports, i.e., a front side USB port 45 and a rear side USB port 46. As will be described later, the MFP 1 sets the USB port to be used in the particular storing function based on the user operation of the touch panel 21 when the particular storing function is enabled (S13 in FIG. 5). For example, the MFP 1 manages a port to be used by storing a registration value indicating the setting of the USB port to be used in the particular storing function in the non-volatile memory 15. Then, the MFP 1 stores the image data 74 and the list data 77 in the USB storage 47 connected to the set USB port. The MFP 1 according to the present embodiment controls the USB port set to be used in the particular storing function as a dedicated port of the particular storing function. For example, when the rear side USB port 46 is set as the USB port to be used in the particular storing function, the MFP 1 executes control for storing only the image data 74 and the list data 77 in the USB storage 47 connected to the rear side USB port 46. Even if a device (e.g., a keyboard) other than the storage device is connected to the rear USB port 46, the MFP 1 does not control the connected device to be usable.

3. USB to Scan Function and Direct Print Function

The MFP 1 according to the present embodiment has a Scan to USB function which is a function of storing scan data in the USB storage 47. In a state where the Scan to USB function is enabled, when, for example, the scan function is started as the user operates the touch panel 21, the MFP 1 reads an image on an original placed on the document table with the image reading part 17 and stores generated scan data in the USB storage 47.

The MFP 1 according to the present embodiment has a Direct Print function which is a function of retrieving image data stored in the USB storage 47 and printing the image data. In a case where the Direct Print function is enabled, when the USB storage 47 is connected to the rear side USB port 46, the MFP 1 displays a list of image data stored in the USB storage 47 on the touch panel 21.

When the user selects one of a plurality of pieces of the image data displayed on the touch panel 21, the MFP 1 retrieves the image data, which is selected from the list, from the USB storage 47, and prints the image data with the printer 16. Thus, the user can print the image data in the USB storage 47 simply by connecting the USB storage 47 and operating the touch panel 21. As described above, the MFP 1 is configured to set the dedicated USB port to be used in the particular storage function. Therefore, when, for example, the rear side USB port 46 is set to be used in the particular storing function, the USB to Scan function and the Direct Print function can be executed using the remaining port, that is, the front side USB port 45. It is noted that the MFP 1 may be configured to execute control in which the USB port used in the particular storing function is shared as a USB port that can also be used in the USB to Scan function or the Direct Print function, instead of controlling the USB port as the dedicated port.

4. Particular Storing Function Enabling/Disabling Process

Figure 5:
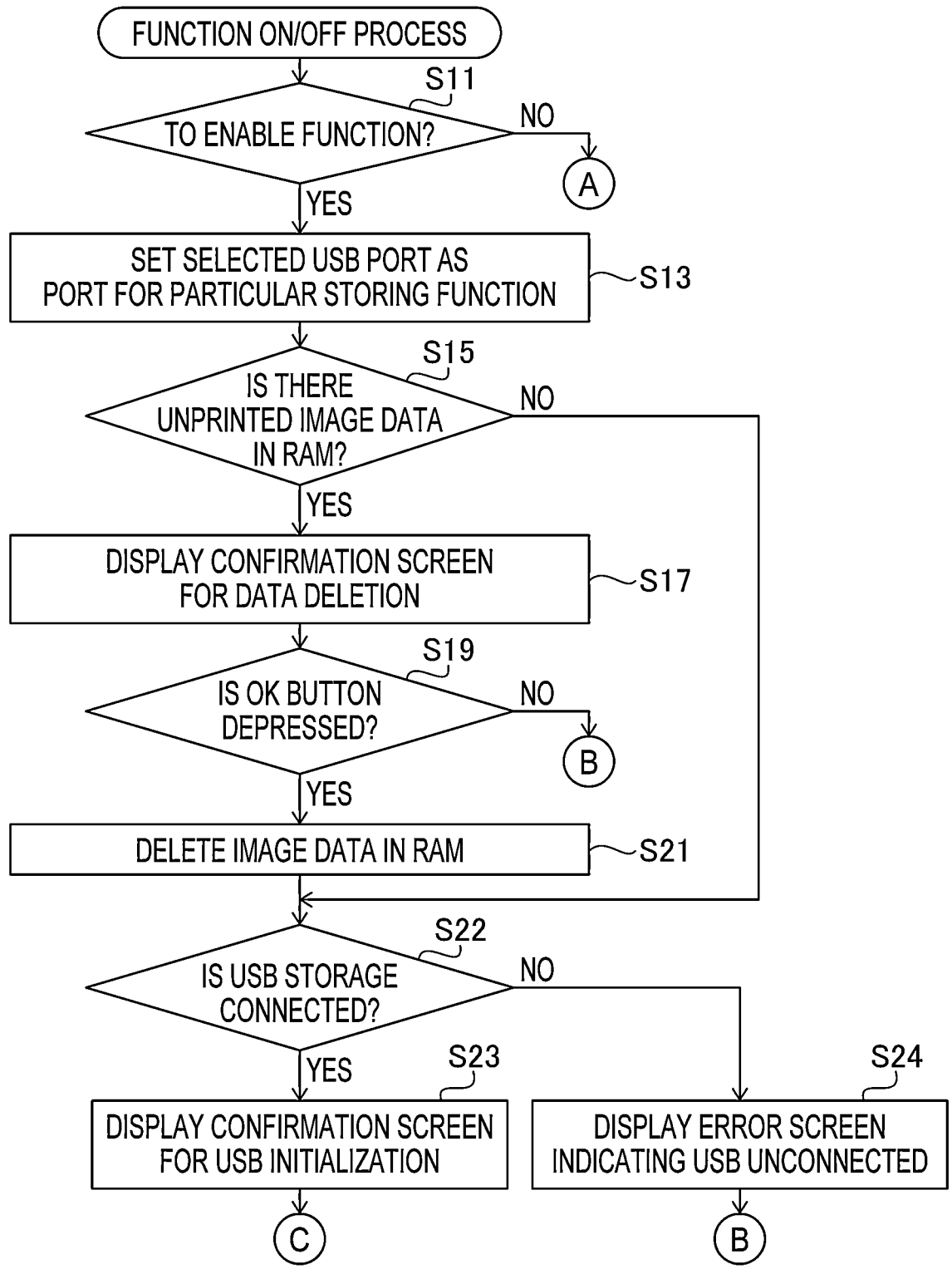
FIGS. 5-7 show a flowchart illustrating a function on-off process.
Figure 6:
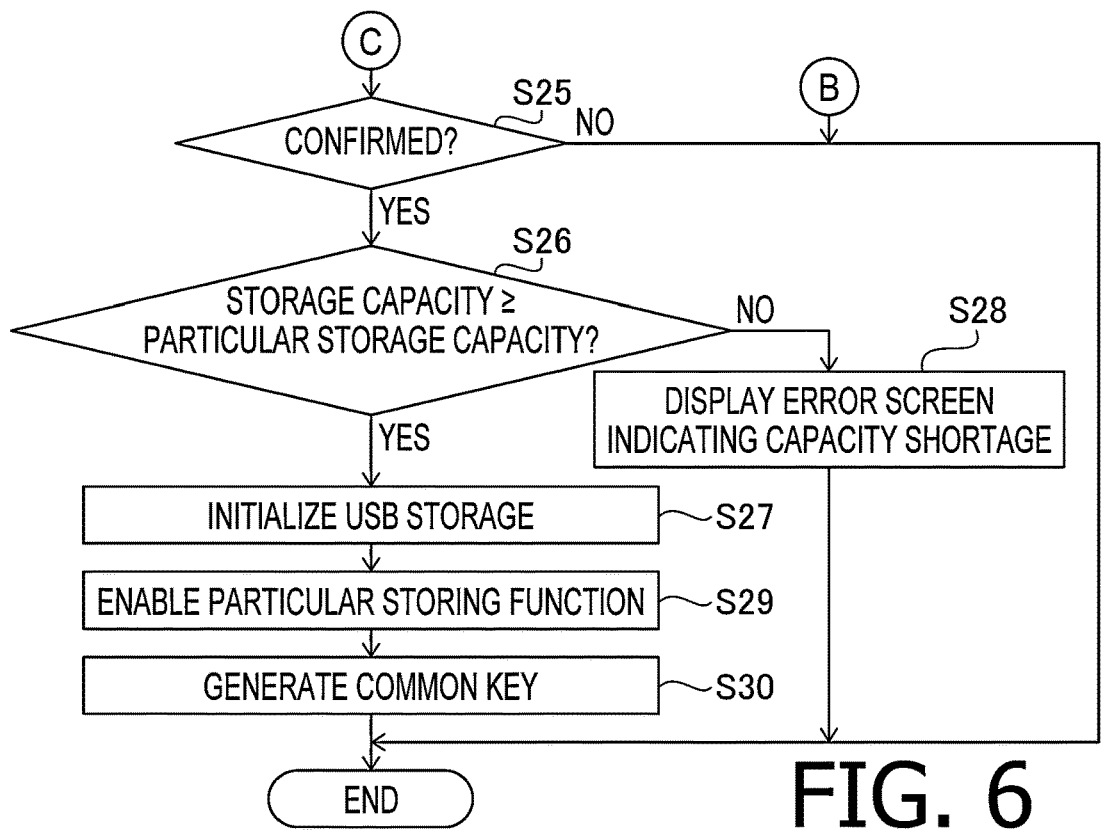
Figure 7:
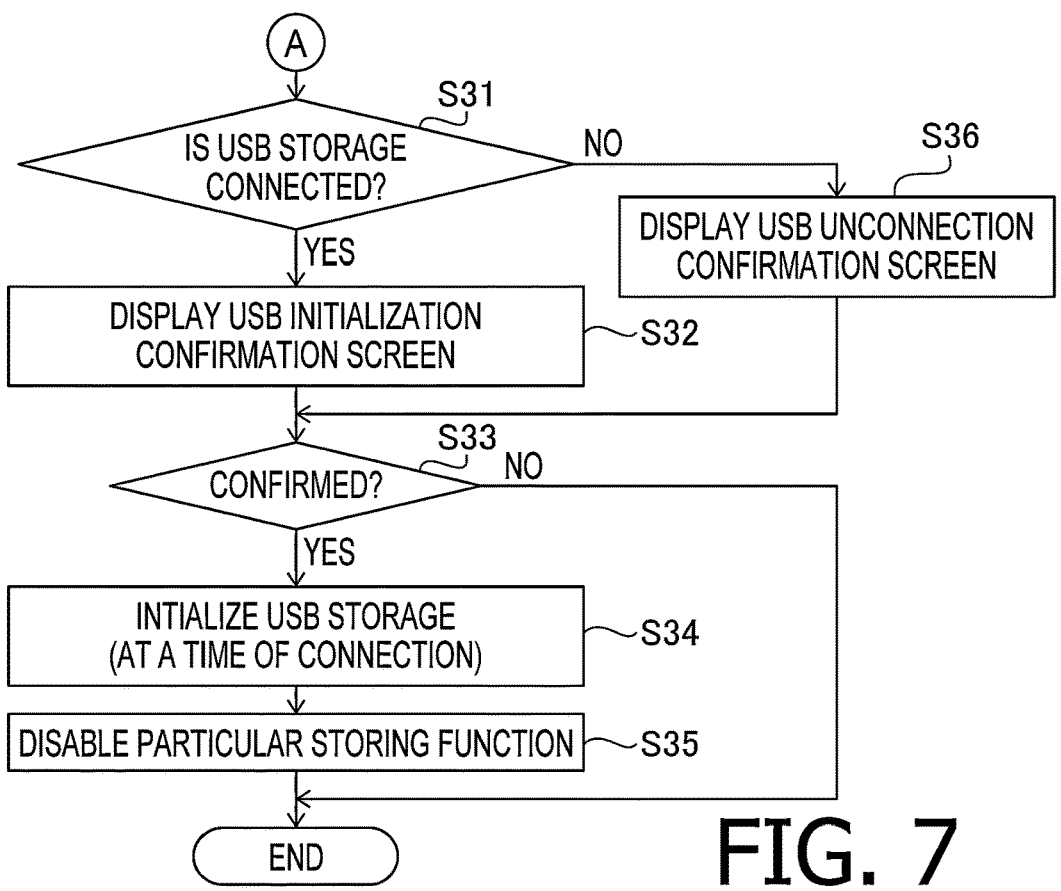

Next, operations of the MFP 1 according to the present embodiment will be described referring to FIGS. 5 to 7. In the following description, an operation when the particular storing function is enabled or disabled in a state where the storage printing function is being enabled will be described. FIGS. 5 and 6 show a flow of a process of enabling the particular storing function, while FIG. 7 shows a flow of a process of disabling the particular storing function. The MFP 1 displays a setting window 81 (see FIG. 3) for receiving whether to enable or disable the particular storing function in accordance with the user operation, for example, on the touch panel 21, and starts the function on/off process shown in FIGS. 5 to 7. It is noted that a timing at which the function on/off processing is started does not need to be limited to the timing at which the setting screen 81 is displayed. For example, the MFP 1 may start the function on/off process shown in FIGS. 5 to 7 after the MFP 1 is powered on and the system is started as the program 31 is executed by the CPU 12.

It should be noted that the flowcharts in this specification basically show processes of the CPU 12 according to instructions described in the programs 31. That is, the processes such as "determination", "reception", "acceptance", "control", "setting" and the like in the following description represent processes of the CPU 12. It should be noted that the processes of the CPU 12 include control of hardware.

First, in S11 of FIG. 5, the CPU 12 of the MFP 1 receives a user operation to enable or disable the particular storing function. The CPU 12 displays the setting window 81 shown in FIG. 3 on the touch panel 21 in response to, for example, a particular user operation with respect to the touch panel 21. As shown in FIG. 3, the CPU 12 displays an off button 83 for disabling the particular storing function, a rear selection button 84 and a front selection button 85 on the setting window 81.

When detecting an operation of pressing the off button 83 (S11:NO), the CPU 12 executes subsequent processes in S31 and subsequent steps in FIG. 7. When detecting an operation of pressing one of the rear selection button 84 and the front selection button 85, the CPU 12 makes an affirmative determination (S11: YES), and executes processes in S13 and subsequent steps in FIGS. 5 and 6.

4-1. Enabling Process

In S13, the CPU 12 sets the USB port corresponding to the button selected in S11 as the USB port to be used in the particular storing function. When detecting depression of the rear selection buttons 84 in S11, the CPU 12 executes a process of setting the rear side USB port 46 to the USB port to be used in the particular storing function in S13. Similarly, when detecting depression of the front selection buttons 85 in S11, the CPU 12 executes a process of setting the front side USB port 45 to the USB port to be used in the particular storing function in S13.

It is noted that, in S11, the CPU 12 may limit the operable buttons according to whether the particular storing function is enabled or disabled. For example, when the particular storing function is enabled, the CPU 12 may be configured to receive only the operation of the off button 83 and invalidate the rear selection button 84 or the front selection button 85 (i.e., the CPU 12 may be configured not to detect the operation of the rear selection button 84 or the front selection button 85). That is, when the particular storing function is being enabled, the CPU 12 may receive only the operation, on the setting screen 81, to disable the particular storing function. Similarly, when the particular storing function is being disabled, the CPU 12 may receive only the operation, on the setting screen 81, to enable the particular storing function (i.e., the touching operation on the rear selection button 84 or the front selection button 85) with invalidating the off button 83.

After setting the USB port in S13, the CPU 12 determines whether there remains unprinted image data 73 in the RAM 13 (S15). As described above, the MFP 1 stores the image data 73 of the received print job 61 in the RAM 13 when the storage printing function is enabled and the particular storing function is disabled, while the CPU 12 stores the image data 74 in the USB storage 47 when the storage printing function is enabled. Therefore, the CPU 12 determines, in S15, whether there remains unprinted image data 73 in the RAM 13 prior to enabling of the particular storing function.

The CPU 12 determines whether there remains unprinted image data 73 based on the list data 76 or the image data 73 stored in the RAM 13. When it is determined that there remains unprinted image data 73 (S15: YES), the CPU 12 displays a confirmation screen through which the user is asked whether or not to delete the image data 73 in the RAM 13 (S17). As shown in FIG. 4, the CPU 12 displays a confirmation screen 90 indicating a message 87 to ask the user to confirm enabling of the function and deleting of the data in the RAM 13, the OK button 88, and the cancel button 89 on the touch panel 21.

Next, in S19, the CPU 12 determines whether the OK button 88 is pressed on the confirmation screen 90 which is displayed in S17. When the CPU 12 detects that the cancel button 89 on the confirmation screen 90 is pressed (S19: NO), the CPU 12 terminates the function on/off process shown in FIGS. 5 to 7. In this case, the CPU 12 does not enable the particular storing function, but maintains a disabled state of the particular storing function.

When the CPU 12 detects that the OK button 88 of the confirmation screen 90 is pressed (S19: Yes), the CPU 12 deletes the image data 73 in the RAM 13 (S21). The CPU 12 also deletes the list data 76 in the RAM 13. That is, the CPU 12 deletes data related to the storage printing function from among pieces of the data stored in the RAM 13.

It is noted that, when the particular storing function is enabled, the CPU 12 may move the image data 73 and the list data 76 in the RAM 13 to the USB storage 47 which is to be used after the particular storing function is enabled instead of deleting the same. That is, the CPU 12 may move the image data 73 or the like that has not been printed to the USB storage 47, and process and print the same as the image data 74 or the list data 77 after the particular storing function is enabled. In this case, the CPU 12 may store the image data 73 and the list data 76 in the USB storage 47 after encrypting the same.

The CPU 12 executes S22 after executing S21. Further, when the CPU 12 determines that there is no unprinted image data 73 in the RAM 13 (S15: NO), the CPU 12 skips S16-S21 and executes S22. In S22, the CPU 12 determines whether the USB storage 47 is connected to the USB port which is set as the port to be used for the particular storing function in S13, that is, the USB port selected in S11.

Figure 8:
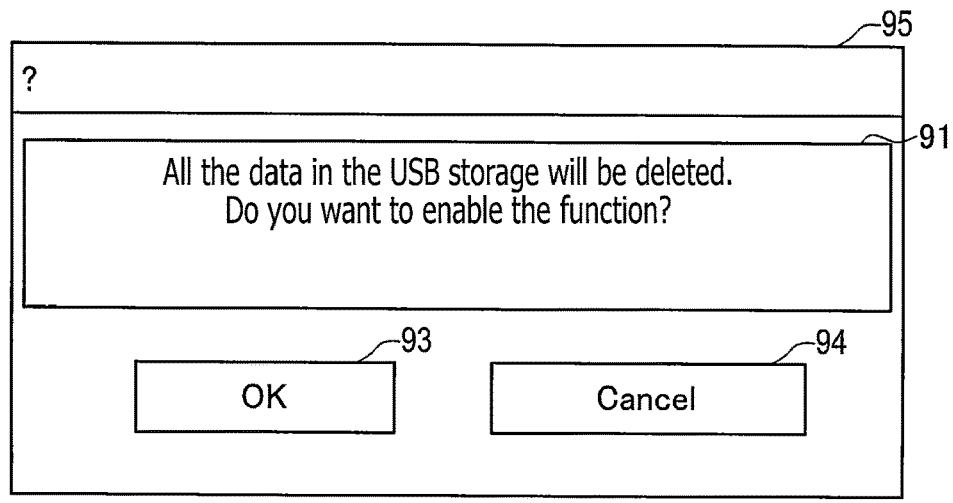
FIG. 8 shows a confirmation screen for confirming initialization of a USB storage.

When detecting that the USB storage 47 is connected to the USB ports which is set to be used in the particular storing function (S22: Yes), the CPU 12 displays a confirmation screen indicating that initialization of the USB storage 47 is performed (S23). As shown in FIG. 8, the CPU 12 displays, on the touch panel 21, a confirmation screen 95 showing a message 91 indicating that all the data in the USB storage 47 is deleted and inquiring whether the user wants enabling of the particular storing function, the OK button 93 and the cancel button 94.

Figure 9:
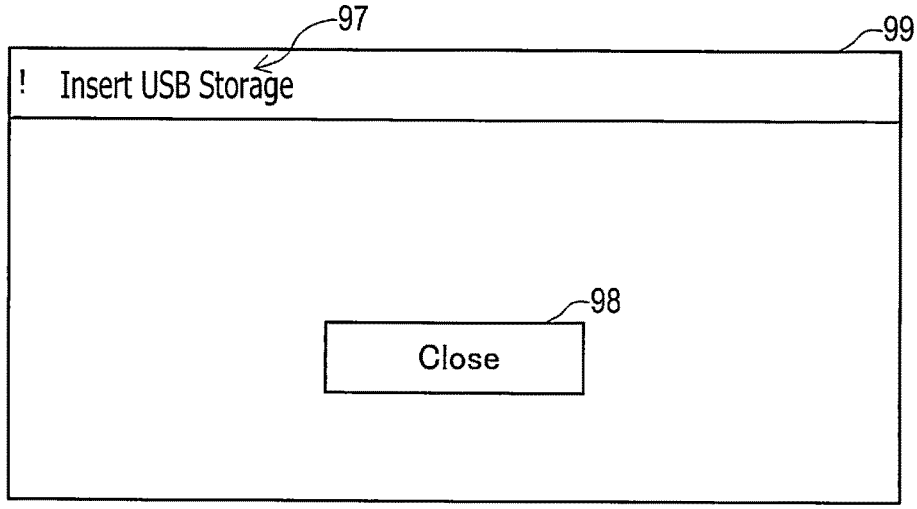
FIG. 9 shows an error screen for notifying that no USB storage is connected.

When the CPU 22 detects that the USB storage 47 is not connected (S22: NO), the CPU 12 displays an error screen indicating that a USB storage 47 is not connected (S24). As shown in FIG. 9, the CPU 12 displays an error screen 99 which shows a message 97 encouraging the user to insert a USB storage 47 and a close button 98, on the touch panel 21. As a result, the user is caused to recognize that no USB storage 47 is currently connected to the USB port selected in S11. When detecting that the close button 98 on the error screen 99 is pressed, the CPU 12 extinguishes the error screen 99 from the touch panel 21 and terminates the function on/off process shown in FIGS. 5 to 7.

After execution of S23, the CPU 12 determines whether the OK button 93 of the confirming screen 95 (see FIG. 8) is pressed (S25 in FIG. 6). When detecting that the OK button 93 is pressed (S25: YES), the CPU 12 executes S26.

When detecting that the cancel button 94 is pressed (S25: NO), the CPU 12 terminates the processes shown in FIGS. 5 to 7. Therefore, when the user does not intend to delete the data in the USB storage 47, the user can temporarily suspend the enablement of the particular storing function and perform an appropriate operation such as transferring of the data from the USB storage 47 to another device.

In S26, the CPU 12 determines whether the storage capacity of the USB storage 47 to be used in the particular storing function is equal to or larger than a particular storage capacity. When the storage capacity of the USB storage 47 to be used for the particular storing function is small, if the data amount of the image data 74 to be stored in the USB storage 47 increases, there may occur a case where the image data 74 cannot be stored completely in the USB storage 47. Further, when the storage capacity of the USB storage 47 is small, the number of times of writing or reading per unit storage area of the USB storage 47 increases, and the possibility of causing a failure of the USB storage 47 increases. Therefore, the MFP 1 of the present embodiment is configured to enable the particular storing function only when the storage capacity of the USB storage 47 is equal to or larger than the particular storage capacity. In this regard, the particular storage capacity referred to in the determination of S26 is a capacity sufficient for storing a plurality of pieces of image data 74 or a capacity sufficient for reducing the frequency of writing and/or reading per unit storage area, and the amount is, for example, 8 GB (gigabytes).

Figure 10:
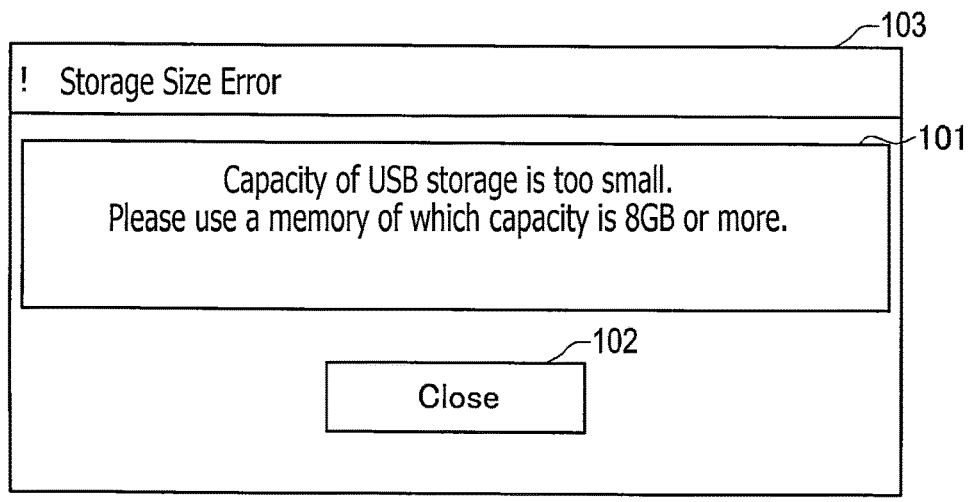
FIG. 10 shows an error screen for notifying shortage of a capacity of a USB storage.

When the CPU 12 determines that the storage capacity is equal to or larger than the particular storage capacity (S26: Yes), the CPU 12 executes S27. When the CPU 12 determines that the storage capacity is less than the particular storage capacity (S26: NO), the CPU 12 displays an error screen indicating shortage of the storage capacity (S28). As shown in FIG. 10, the CPU 12 displays, on the touch panel 21, an error screen 103 showing a message 101 indicating that the storage capacity of the USB storage 47 is too small and a USB storage 47 having a particular storage capacity (e.g., 8 GB) or more should be used, and a close button 102. This causes the user to recognize that the capacity of the USB storage 47 is insufficient. When detecting that the close button 102 on the error screen 103 is pressed, the CPU 12 extinguishes the error screen 103 from the touch panel 21 and terminates the process shown in FIGS. 5 to 7.

In S27, the CPU 12 initializes the USB storage 47. For example, when the CPU 12 is capable of detecting a data format of the USB storage 47, the CPU 12 deletes all the data stored in the USB storage 47. When the CPU 12 is unable to detect the data format of the USB storage 47, the CPU 12 deletes the data stored therein by formatting the storage area of the USB storage 47 into a format enabling the USB storage 47 to store the image data 74 therein.

Next, the CPU 12 stores, in the non-volatile memory 15, the registration value indicating that the particular storing function is enabled (S29). Then, the MFP 1 is brought into a condition in which the particular storing function is enabled. Next, the CPU 12 generates the common key 78 (S30). As described above, the common key 78 is used for encrypting and decrypting the image data 74 and the list data 77 stored in the USB storage 47. The CPU 12 activates a random number generation module for generating a random number and a key generation module for generating the common key 78 by executing, for example, a particular program included in the programs 31. The key generation module generates the common key 78 using the random number, which is generated by the random number generation module, and a function of generating the common key 78. Therefore, the MFP 1 according to the present embodiment newly generates the common key 78 to be used for encryption every time the particular storing function is enabled. The CPU 12 stores the generated common key 78 in the non-volatile memory 15 and terminates the process shown in FIGS. 5 to 7.

The method and the processes for encrypting the image data 74 and the list data 77 should not necessarily be limited to those described above. Further, the CPU 12 may store the image data 74 or the like in the USB storage 47 without encrypting the same. That is, the CPU 12 may store, in the USB storage 47, the image data 74 and the list data 77 by, for example, setting passwords to them in order to enhance security thereof.

4-2. Disabling Process

Next, a process shown in FIG. 7 will be described. When the CPU 12 detects that the off button 83 on the setting window 81 shown in FIG. 3 is pressed (S11: NO), the CPU 12 executes steps S31 onwards in FIG. 7. In S31, the CPU 12 determines whether the USB storage 47 is connected to the USB port which is being used in the particular storing function (i.e., the USB port set in S13 of FIG. 5). When detecting that the USB storage 47 is connected (S31: YES), the CPU 12 displays a confirmation window requesting the user to confirm that that the USB storage 47 is to be initialized (S32).

Figure 11:
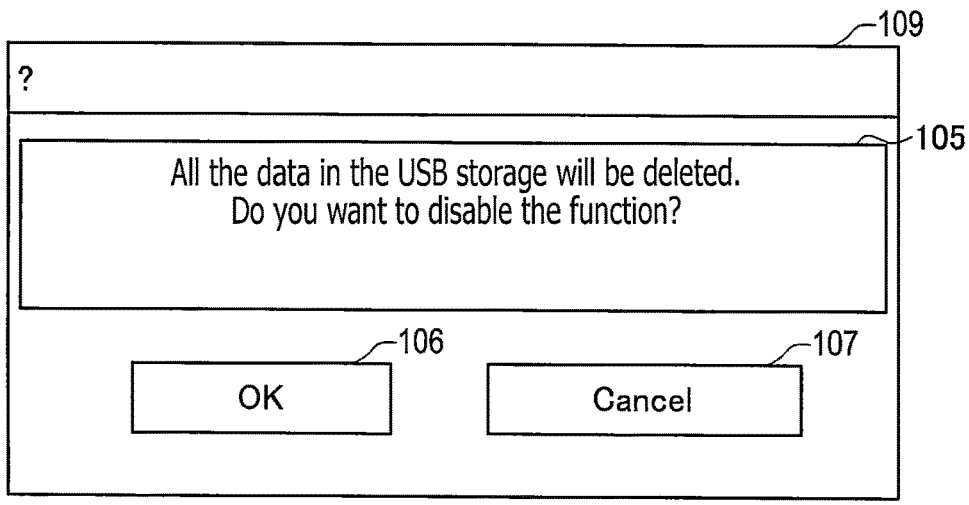
FIG. 11 shows a confirmation screen for confirming execution of initialization of a USB storage.

As shown in FIG. 11, the CPU 12 displays, on the touch panel 21, a confirmation screen 109 showing a message 105 indicating that all the data in the USB storage 47 will be deleted and the function is disabled, an OK button 106 and a cancel button 107 (S32). Next, the CPU 12 determines whether the OK button 106 has been pressed (S33). When detecting that the OK button 106 is pressed (S33: YES), the CPU 12 initializes the USB storage 47 by deleting all the data, including the image data 74 and the list data 77, in the USB storage 47 (S34). Then, the CPU 12 stores, in the non-volatile memory 15, a registration value indicating that the particular storing function has been disabled (S35). As a result, the MFP 1 is brought into a condition in which the particular storing function is disabled. Then, the CPU 12 terminates the process shown in FIGS. 5 to 7.

It is noted that the CPU 12 may delete, in S34, only the image data 74 and the list data 77 from the data stored in the USB storage 47. Further, the CPU 12 may be configured not to delete the image data 74 or the list data 77 in the USB storage 47 but move the same to the RAM 13 when the particular storing function is disabled. Then, the CPU 12 may process the image data 74 and the list data 77 as the image data 73 and the list data 76 after being disabled, and perform printing or the like.

Figure 12:
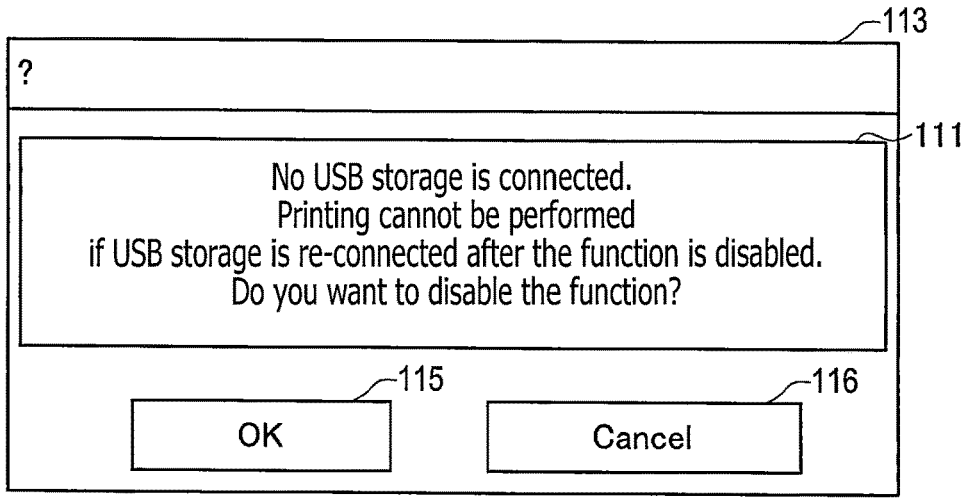
FIG. 12 shows an error screen for notifying that no USB storage is connected.

When detecting that no USB storage 47 is connected (S31: NO), the CPU 12 displays a confirmation screen 113 on the touch panel 21 (S36). As shown in FIG. 12, the CPU 12 displays a message 111 indicating that no USB storage 47 is connected to the USB storage 47 on the confirmation screen 113. Further, the CPU 12 also displays the message 111 indicating that, even if the USB storage 47 is connected again and enable the particular storing function after the particular storing function was disabled, printing cannot be performed. It is because the MFP 1 according to the present embodiment newly generates the common key 78 to be used for decryption every time the particular storing function is enabled (S30 of FIG. 6). The CPU 12 also displays a message inquiring whether or not to disable the particular storing function in the message 111. In addition, the CPU 12 displays an OK button 115 and a cancel button 116 on the confirmation screen 113. After executing S36, the CPU 12 executes S33.

In S33, the CPU 12 determines whether the OK button 115 is pressed (S33). When the CPU 12 detects that the OK button 115 is pressed (S33: YES), since the USB storage 47 is not connected to the USB storage 47, the CPU 12 does not execute the initialization process of the data in S34, and executes setting of the flag value in S35. When the CPU 12 detects that the cancel button 116 is pressed (S33: NO), the CPU 12 terminates the process shown in FIGS. 5 to 7. In this manner, the CPU 12 performs enabling or disabling of the particular storage function.

5. Receiving Process

Figure 14:
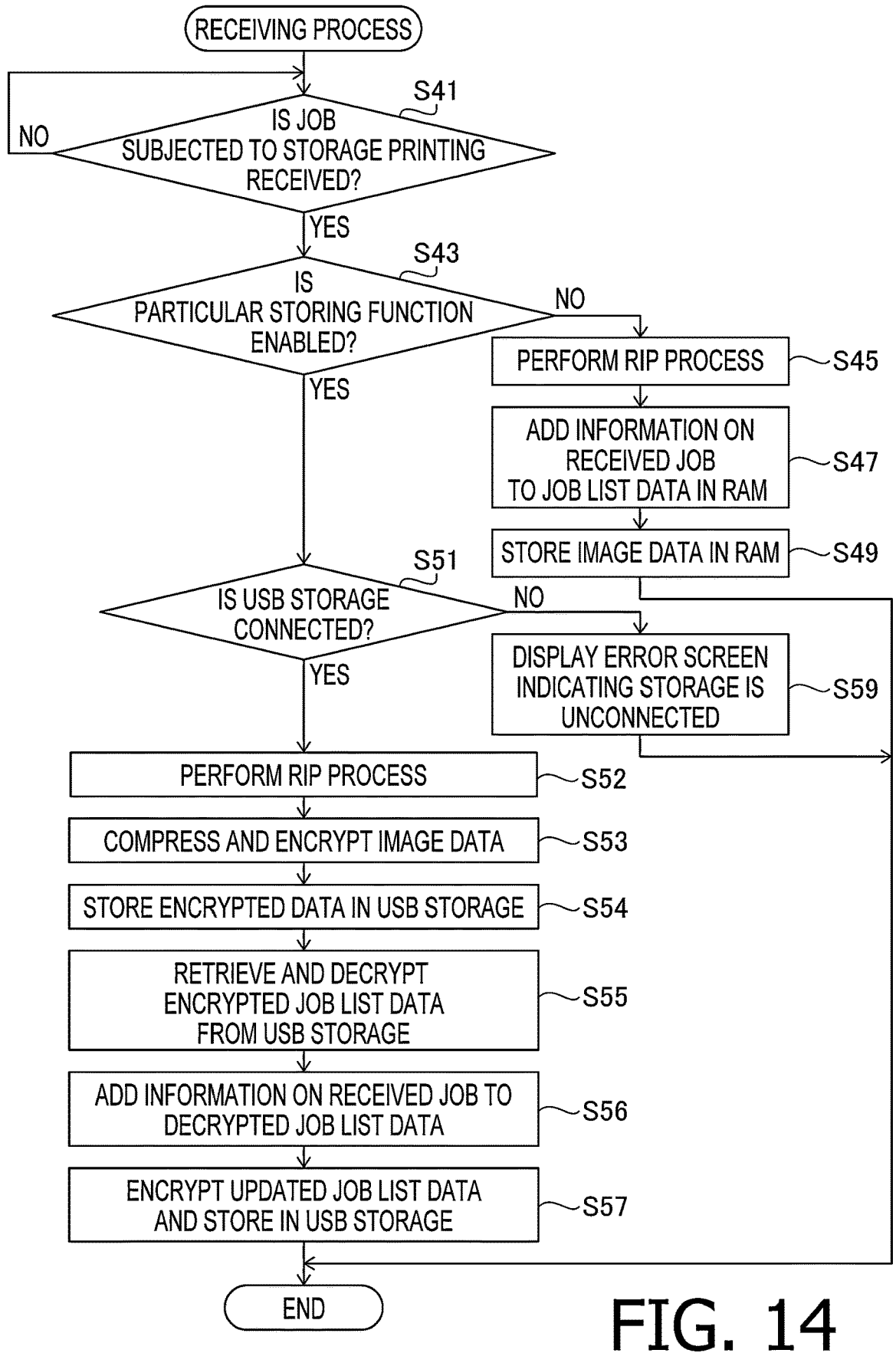
FIG. 14 is a flowchart illustrating a receiving process.

Next, a receiving process of the print job 61 in the storage printing function and the particular storing function will be described. FIG. 14 shows a flow of a receiving process when the print job 61 to be subjected to the storage printing is received. The print job 61 to be subjected to the storage printing is a print job 61 which is different from a normal print job. It is noted that, when the normal print job is transmitted from the PC 53 to the network OF 24, printing is started in accordance with the print job upon reception of the same. The print job 61 subjected to the storage printing is a print job which is temporarily stored in the RAM 13 or the USB storage 47 when the above described storage printing function or the particular storing function is enabled. More specifically, the print job 61 is a print job to which the job name 63 and the user name 65 shown in FIG. 1 are set. When, for example, the storage printing function is enabled, the MFP 1 starts the receiving process shown in FIG. 14.

First, in S41 of FIG. 14, the CPU 12 determines whether the print job 61 to be subjected to the storage printing has been received via the network OF 24. It is noted that the CPU 12 keeps repeatedly executing the determination process of S41 until (S41: NO) the print job 61 is received. Upon receiving the print job 61 (S41: YES), the CPU 12 determines whether the particular storing function is enabled (S43).

As described above, the CPU 12 stores the flag value representing the enabling/disabling of the particular storing function in the non-volatile memory 15 in response to switching of enabling/disabling of the particular storing function. In S43, the CPU 12 can determine whether the particular storing function is enabled or disabled based on the flag value stored in the non-volatile memory 15. When the CPU 12 determines that the particular storing function is disabled (S43: NO), the CPU 12 cause the image processing circuit 14 to execute the RIP process (S45).

The image processing circuit 14 rasterizes, for example, PDL data included in the print job 61 to generate image data 73 (S45) which is the raster data. The CPU 12 updates the list data 76 stored in the RAM 13 (S47). The CPU 12 adds information on newly received print job 61 to the list data 76 based on the job name 63 and/or the user name 65 set to the print job 61 of which reception is detected in S41 (see FIG. 1), reception date and time and the like (S47).

Next, the CPU 12 stores the generated image data 73 in the RAM 13 (S49). At this stage, the CPU 12 may store the image data 73 in the RAM 13 after compressing the image data 73 to reduce the amount of data. After executing S49, the CPU 12 terminates the receiving process shown in FIG. 14. As a result, the information regarding the print jobs 61, which is received with the storage printing function being enabled and the particular storing function being disabled, is added to the list data 76, and the image data 73 is stored in the RAM 13.

When it is determined that the particular storing function is enabled (S43: YES), the CPU 12 determines whether the USB storage 47 is connected to the MFP 1 (S51). Specifically, the CPU 12 determines whether the USB storage 47 is connected to the USB port selected in S11 of FIG. 5, i.e., the front side USB port 45 or the rear side USB port 46.

When the CPU 12 determines that the USB storage 47 is connected to the USB storage 47 (S51: YES), the CPU 12 rasterizes the PDL data included in the print job 61 to generate the image data 74 (S52), as is done in S45. After compressing the rasterized image data 74, the CPU 12 encrypts the compressed image data 74 (S53). The CPU 12 encrypts the image data 74 using the common key 78, which is newly generated when the particular storing function is enabled (S30 of FIG. 6). Then, the CPU 12 stores the encrypted image data 74 in the USB storage 47 (S54).

Next, the CPU 12 retrieves the list data 77 from the USB storage 47 and decrypts the same (S55). The CPU 12 is configured, for example, to retrieve the list data 77 and temporarily store the same in the RAM 13, and decrypts the list data 77 in the RAM 12 using the common key 78. As in S47, the CPU 12 adds the information (e.g., a job name 63, etc.) of the print job 61, reception of which is detected in S41, to the decrypted list data 77 to update the list data 77 (S56). Then, the CPU 12 re-encrypts the updated list data 77 using the common key 78, and stores the re-encrypted list data 77 in the USB storage 47. As a result, the information regarding the newly received print job 61 is added to the list data 77, and the new image data 73 is stored in the USB storage 47. After executing S57, the CPU 12 terminates the receiving process shown in FIG. 14. It is noted that the CPU 12 may be configured to store the list data 77 in the USB storage 47 in a compressed manner in order to reduce the amount of the data to be stored (i.e., in order to save the capacity of the USB storage 47).

Figure 13:
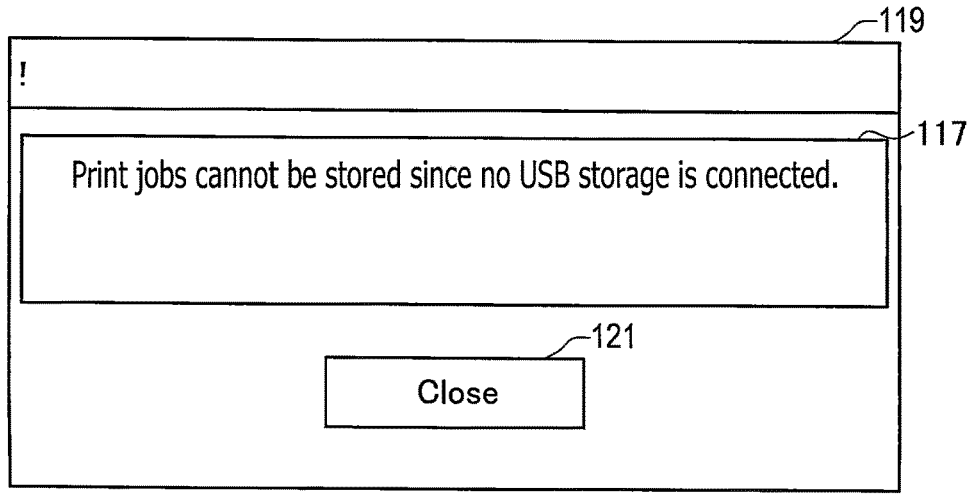
FIG. 13 shows an error screen for notifying that no USB storage is connected.

When it is determined that no USB storage 47 is connected to the MFP 1 (S51: NO), the CPU 12 displays an error screen indicating that no USB storage 47 is connected (S59). As shown in FIG. 13, the CPU 12 displays, on the touch panel 21, an error screen 119 showing a message 117 indicating that a print job cannot be stored since no USB storage 47 is connected to the MFP 1. The CPU 12 keeps displaying the error screen 119 on the touch panel 21 until, for example, the close button 121 of the error screen 119 is touched. According to a such configuration, a state where the user is caused to recognize that the print job cannot be stored so that the user can execute appropriate measures, e.g., an operation to connect a USB storage 47. After executing S59, the CPU 12 terminates the process shown in FIG. 14.

It is noted that the CPU 12 may be configured to discard, in S59, the print job 61 which is planned to be stored in the USB storage 47 but store the same in the RAM 13 and receive the user's instruction. Alternatively, the CPU 12 may be configured to cause the PC 53, which is a transmission source of the print job 61, to display the error screen 119. That is, the CPU 12 may be configured, for example, to communicate with a printer driver installed in the PC 53 and causes the printer driver of the PC 53 to display the error screen 119 on a screen of the PC 53.

6. Storage Printing Process

Figure 15:
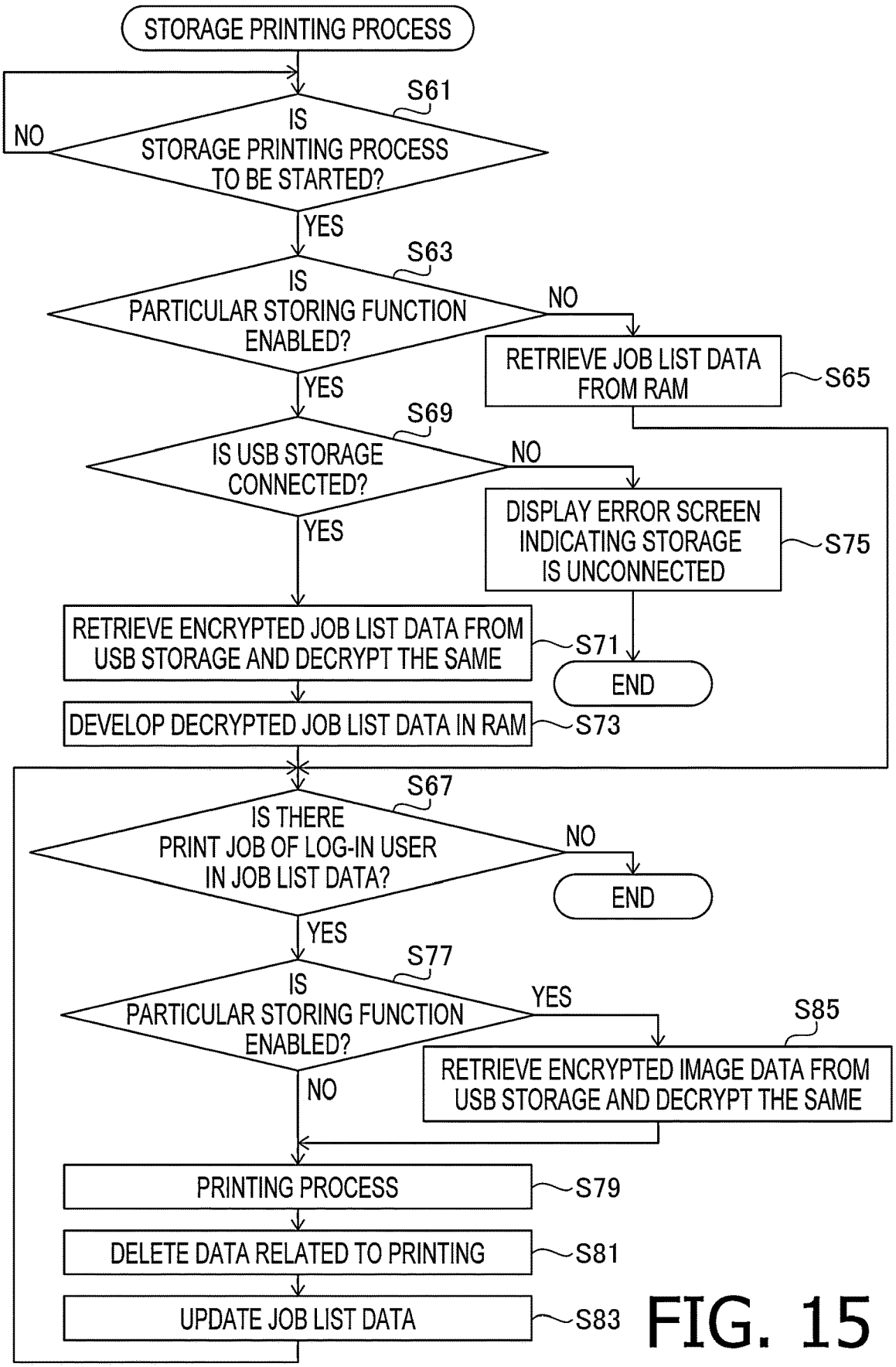
FIG. 15 is a flowchart illustrating a storage printing process.

Next, the storage printing process will be described referring to a flowchart shown in FIG. 15. When the storage printing function has been enabled, the MFP 1 starts the storage printing process shown in FIG. 15. First, the CPU 12 determines whether to start the storage printing process (S61 of FIG. 15). As described above, the MFP 1 according to the present embodiment starts the storage printing with being triggered by success of login authentication through the touch panel 21. Therefore, when the CPU 12 determines that the login operation has been performed in response to the operation with respect to the touch panel 21 and the login authorization has been performed successfully (S61: YES), the CPU 12 performs S63 and the following steps. It is noted that the CPU12 repeatedly executes the determination process of S61 until (S61:NO) it is determined that the login authorization has been performed successfully. It should be noted that the determination condition of S61 should not necessarily be limited to the success condition of the login authentication. For example, the CPU 12 may be configured to determine whether to execute the processes of S63 and subsequent steps based on a particular operation (e.g., an operation of selecting a print job 61) through the touch panel 21.

Next, in S63, the CPU 12 determines whether the particular storing function is enabled. As in S43 (FIG. 14), the CPU 12 determines whether the particular storing function is enabled or disabled based on the flag value stored in the non-volatile memory 15 (S63). When the CPU 12 determines that the particular storing function is disabled (S63: NO), the CPU 12 retrieves the list data 76 (see FIG. 1) from the RAM 13 (S65). As described above, when the storage printing function is enabled while the particular storing function is disabled, the CPU 12 stores the list data 76 in the RAM 13 without encrypting the same. Accordingly, it is unnecessary for the CPU 12 to decrypt the list data 76 retrieved in S65, thereby the processing time for the retrieval being shortened. After executing S65, the CPU 12 executes S67.

When the CPU 12 determines that the particular storing function is enabled (S63: YES), the CPU 12 determines whether or not the USB storage 47 is connected (S69). Specifically, according to the present embodiment, the CPU 12 determines whether or not the USB storage 47 is connected to the USB port (the front side USB port 45 or the rear side USB port 46, which is set to be used in the particular storing function) selected in S11 of FIG. 5.

When the CPU 12 determines that the USB storage 47 is connected (S69: YES), the CPU 12 retrieves the list data 77 (see FIG. 1) from the USB storage 47 (S71). When the particular storing function is enabled, the CPU 12 encrypts the list data 77 and stores the same in the USB storage 47. Therefore, in S71, the CPU 12 decrypts the list data 77 retrieved from the USB storage 47. The CPU 12 retrieves the list data 77 from USB storage 47, temporarily stores the same in the RAM 13 and decrypts the list data 77 stored in the RAM 13 using the common key 78 generated in S30 in FIG. 6. The CPU 12 develops the decrypted list data 77 in the RAM 13 (S73), and then executes S67.

Figure 16:
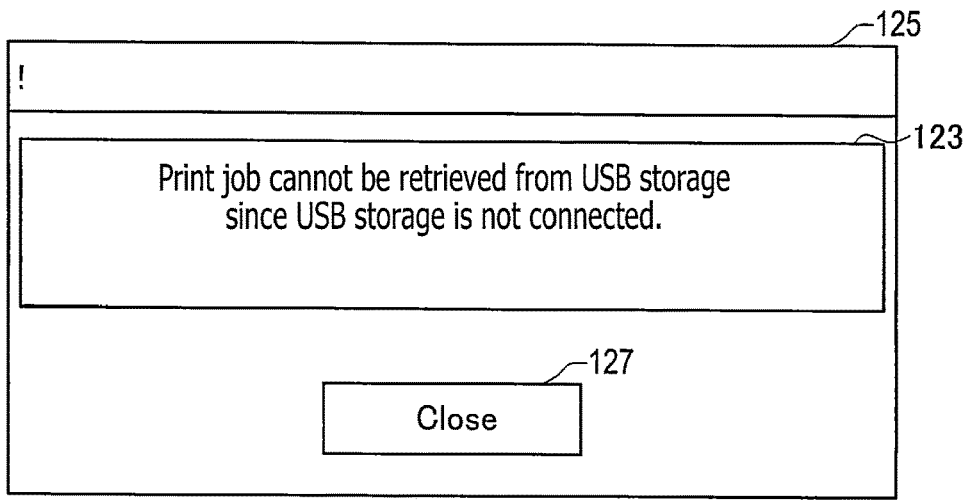
FIG. 16 shows an error screen for notifying that no USB storage is connected.

When the CPU 12 determines that no USB storage 47 is connected (S69: NO), the CPU 12 displays an error screen (S75). As shown in FIG. 16, the CPU 12 displays, on the touch panel 21, an error screen 125 showing a message 123 indicating that the image data 74 cannot be retrieved from the USB storage 47 since no USB storage 47 is connected to the MFP 1. The CPU 12 may be configured to keep displaying the error screen 125 on the touch panel 21 until, for example, the close button 127 of the error screen 125 is touched. As a result, the user is caused to recognize that no USB storage 47 is connected, and the user can execute appropriate measures such as connecting of the USB storage 47. After executing S75, the CPU 12 terminates the accumulated print process shown in FIG. 16.

In S67, the CPU 12 determines whether there exists the print job 61 associated with a name of the user whose login is detected in S61, that is, the print job 61 associated with the name of the currently logging-in user (i.e., a job record including the user name who is currently logging in) in the list data (list data 76 when S65 is executed and list data 77 when S73 is executed). When the CPU 12 determines that no print job 61 associated with the name of the logging-in user exists in the list data 76 or 77 (S67: NO), the CPU 12 terminates the process shown in FIG. 15. In such a case, since no print job 61 of the logging-in user is stored, no print job 61 to be printed exists.

When it is determined that there exists the print job 61 of the logging-in user the list data 76 and 77 (S67: YES), the CPU 12 determines, as in S63, whether the particular storing function is enabled (S77). When the CPU 12 determines that the particular storing function is disabled (S77: NO), the CPU 12 selects the print job 61 of the logging-in user from among the print jobs 61 in the list data 76, and retrieves the image data 73 corresponding to the selected print job 61 from the RAM 13. The retrieved image data 73 is unencrypted data. In S79, the CPU 12 performs printing with use of the printing unit 16 in accordance with the image data 73.

In S81, the CPU 12 deletes the data related to printing performed in step S79. That is, in S81, the CPU 12 deletes, for example, the image data 73 based on which printing has been performed or temporary data generated in the printing process from the RAM 13. Then, the CPU 12 updates the list data 76 by deleting information (i.e., the record) related to the print job 61 which has been executed from the list data 76 (S83).

It is noted that, in the present embodiment, the CPU 12 is configured to perform the deletion process (S81) and the updating process (S83) every time printing is executed in S79. However, the CPU 12 may be configured not to perform such processes (S81 and/or S83). For example, the CPU 12 may be configured to collectively delete the image data 73 of the executed print jobs 61 and update the list data 76 after performing all the print jobs 61 of the logging-in user.

After executing S83, the CPU 12 executes S67 again to determine whether there exists a print job 61 of the logging-in user in the updated list data 76, that is, whether there exists another print job 61 for which the storage printing has not been completed. When there remain print jobs 61 of the logging-in user (S67: YES), the CPU 12 executes the printing process and updates the list data 76 by executing S77 and subsequent steps. When the storage printing of all the print jobs 61 of the logging-in user has been completed (S67: NO), the CPU 12 terminates the storage printing process shown in FIG. 15.

When the CPU 12 determines that the particular storing function is enabled (S77: YES), the CPU 12 selects the print job 61 of the logging-in user from among the print jobs 61 in the list data 77, and retrieves the image data 74 corresponding to the print job 61 from the USB storage 47 (S85). Since the image data 74 is encrypted, the CPU 12 decrypts the retrieved image data 74 (S85), and executes printing in accordance with the decrypted image data 74 (S79). The CPU 12 deletes the image data 74 which has been printed in S79 (S81) and updates the list data 77 (S83), and then executes the determining process in S67, as in a manner similar to a case where the particular storing function is disabled. The CPU 12 repeatedly executes the processes of S77 to S85 until there are no print jobs 61 of the logging-in user in the list data 77.

7. Process when Functions Other than Storage Printing are Executed

Next, a process of storing image data in the USB storage 47 when functions other than the storage printing are performed will be described. In the following description, a Scan to USB function will be described as one of such functions in which the image data is stored in the USB storage 47.

Figure 19:
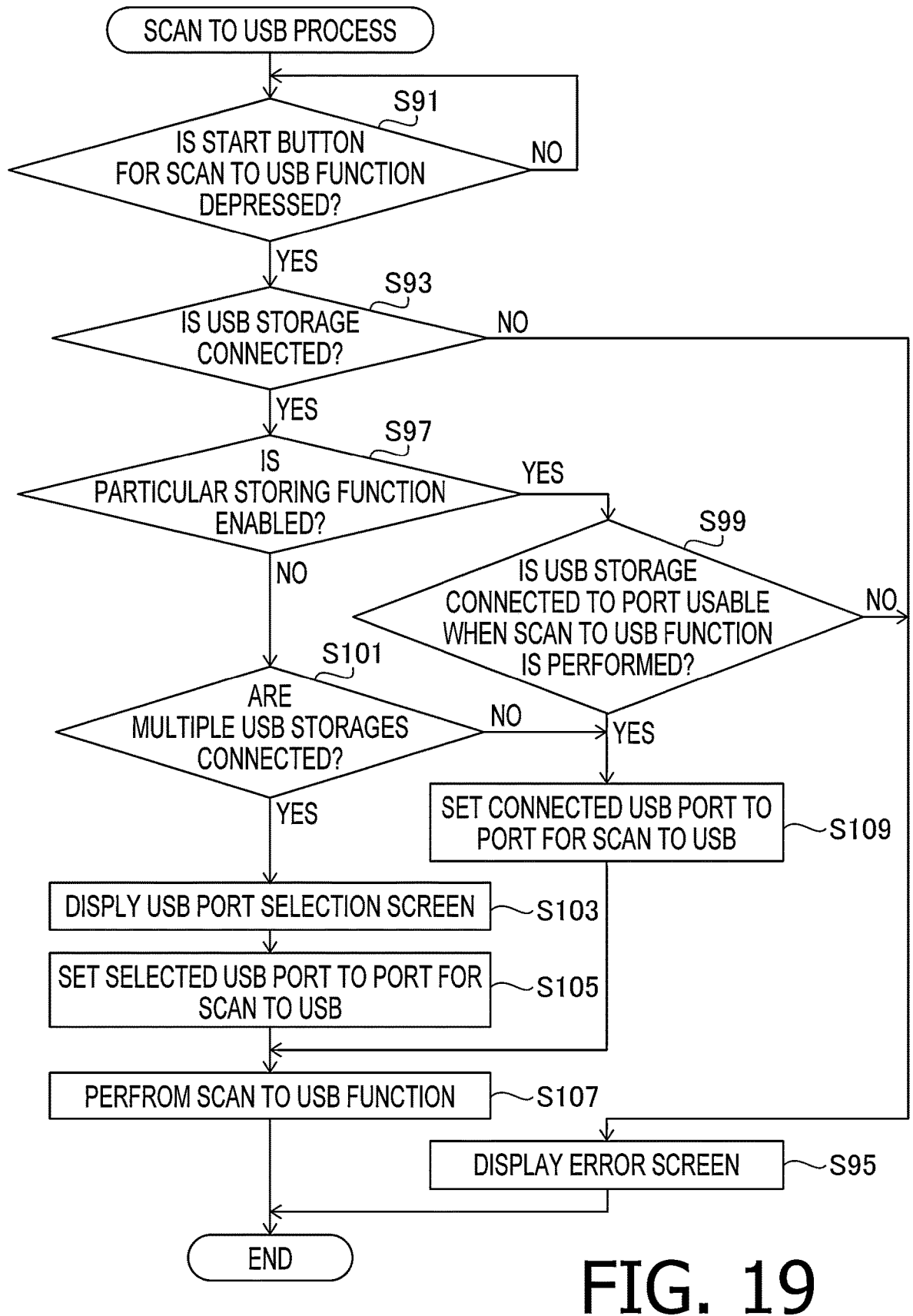
FIG. 19 is a flowchart illustrating the Scan to USB function process.

FIG. 19 is a flowchart illustrating the Scan to USB process. Initially, the CPU 12 displays a start button for executing the Scan to USB function on the touch panel 21. Thereafter, the CPU 12 starts the Scan to USB process shown in FIG. 19. As functions of storing the image data in the USB storage 47 other than the storage storing function, a function of storing FAX data, which is an example of the image data and received via the FAX OF 18, in the USB storage 47 may be employed optionally or alternatively to the Scan to USB function. When the function of storing the FAX data is employed as the function of storing the image data to the USB storage 47, the FAX data may be stored in the USB storage 47 with checking whether the USB storage 47 is connected to the MFP 1, as in a case of the Scan to USB function.

First, in S91 of FIG. 19, the CPU 12 determines whether the start button (not shown) for starting the Scan to USB process is pressed. The CPU 12 repeatedly executes the determination process of S91 until the start button is pressed (S91: NO).

When detecting that the start button is pressed (S91: YES), the CPU 12 determines whether the USB storage 47 is connected to the MFP 1 (S93). When the CPU 12 determines that the USB storage 47 is connected to at least one of the front side USB port 45 and the rear side USB port 46, the CPU 12 makes an affirmative decision in S93 (S93: YES). When the CPU 12 determines that the USB storage 47 is not connected to the front side USB port 45 or the rear side USB port 46, the CPU 12 makes a negative decision in S93 (S93: NO).

Figure 17:
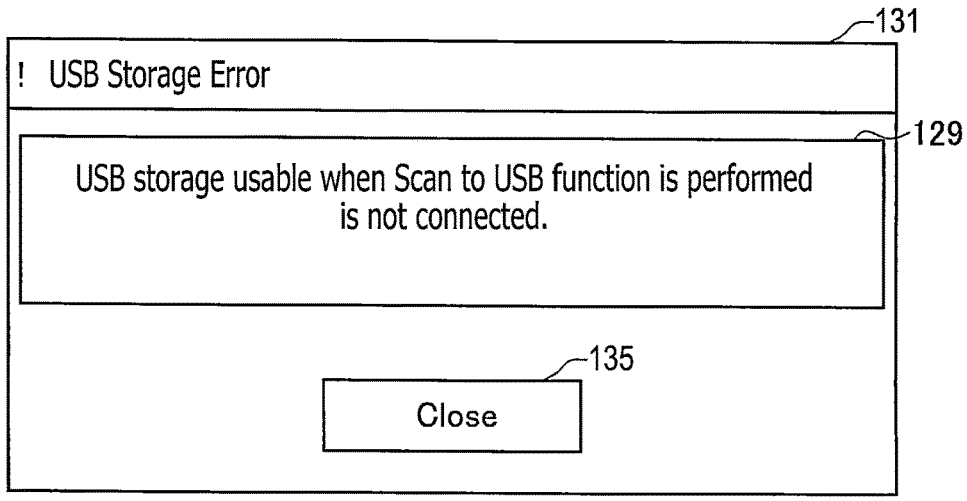
FIG. 17 shows an error screen for notifying that no USB storage is connected.

When the CPU 12 determines that the USB storage 47 is not connected to the front side USB port 45 or the rear side USB port 46 (S93: NO), the CPU 12 displays an error screen (S95). In this instance, since no USB storage 47 is connected to the MFP 1, as shown in FIG. 17, the CPU 12 displays, on the touch panel 21, an error screen 131 showing a message 129 indicating that a USB storage 47 that can be used in the Scan to USB function is not connected. The CPU 12 keeps displaying the error screen 131 on the touch panel 21 until, for example, a close button 135 to close the error screen 131 is touched. As a result, the user will be prompted to connect the USB storage 47 to the MFP 1. After executing S95, the CPU 12 terminates the process shown in FIG. 19.

When the CPU 12 determines that the USB storage 47 is connected to at least one of the front side USB port 45 and the rear side USB port 46 (S93: YES), the CPU 12 determines whether the particular storing function is enabled (S97). Then, the CPU 12 determines whether the particular storing function is enabled or disabled based on the flag value stored in the non-volatile memory 15. When the particular storing function is enabled (S97: YES), the CPU 12 executes S99, while when the particular storing function is disabled (S97: NO), the CPU 12 executes S101.

In S101, the CPU 12 determines whether multiple USB storages 47 are connected to the MFP 1. As mentioned above, the MFP 1 according to the present embodiment has two USB ports, the front side USB port 45 and the rear side USB port 46. When the particular storage function is disabled, both the two USB ports can be used in the Scan to USB function. Therefore, in S101, the CPU 12 determines whether two USB storages 47 are connected to the two USB ports, respectively.

Figure 18:
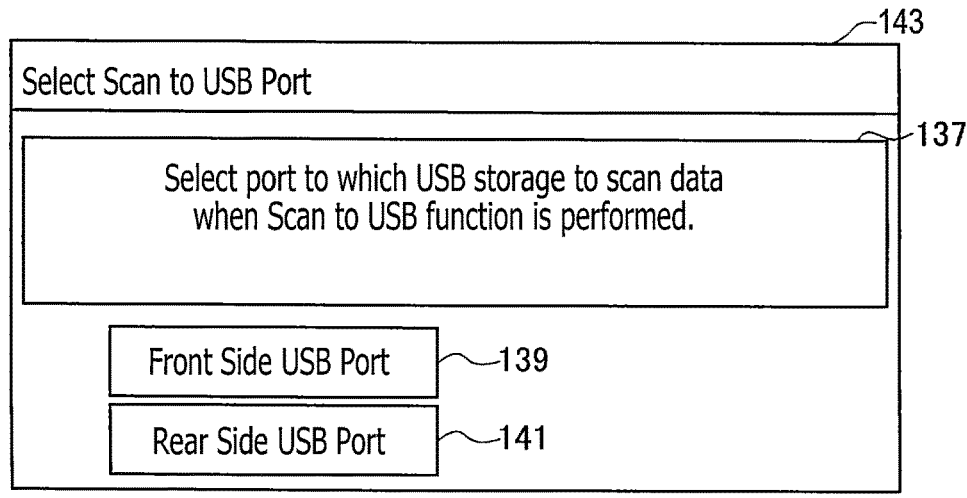
FIG. 18 shows a selection screen encouraging a user to select a port to be used in the Scan to USB function.

When detecting that two USB storages 47 are connected to the two USB ports, respectively (S101: YES), the CPU 12 displays a selection window for prompting the user to select one of the USB ports (S103). In S103, the CPU 12 displays a selection screen 143 on the touch panel 21. The selection screen 143 includes, as shown in FIG. 18, a message 137 prompting selection of a USB port to which the USB storage 47 configured to store the scan data generated by Scan to USB function is connected, a selection button 139 for selecting the front USB port 45, and a selection button 141 for selecting the rear USB port 46. When detecting pressing of any of the selection buttons 139 and 141 in the selection window 143, the CPU 12 sets the USB port corresponding to the pressed one of the selection buttons 139 and 141 as a port to be used in the Scan to USB function (S105).

Next, in S107, the CPU 12 performs the Scan to USB process using the USB storage 47 which is connected to the USB port set in S105. The CPU 12 performs reading of an original using the image reading part 17, and stores generated scan data in the USB storage 47 connected to the USB port set in S105. In this instance, the CPU 12 stores the scanned data in an unencrypted manner. This is because, when the scan data is checked by the PC 53 or the like, if the scan data is encrypted, checking cannot be performed if the scan data is encrypted. After executing S107, the CPU 12 terminates the Scan to USB process shown in FIG. 19.

When the CPU 12 detects that the USB storage 47 is connected to only one of the two USB ports (S101: NO), the CPU 12 executes S109. In this case, the USB storage 47 is connected to one of the front USB port 45 and the rear USB port 46. The CPU 12 sets the USB port to which the USB storage 47 is connected to the USB port to be used in the Scan to USB function (S109). Then, the CPU 12 performs the Scan to USB process using the USB port as set and the USB storages 47 connected thereto (S107).

In S99, the CPU 12 determines whether there are USB ports available for the Scan to USB function. When the CPU 12 executes S99, the particular storing function has been enabled. In addition, since the MFP 1 according to the present embodiment includes only two USB ports (i.e., the front side USB port 45 and the rear side USB port 46), when one of the two USB ports is used as a dedicated port for a particular storage function, there remains only one USB port that can be used for another function (e.g., the Scan to USB function). Therefore, in S99, the CPU 12 can determine whether there is a USB port that can be used in the Scan to USB function by determining whether the USB storage 47 that can store the scanned data is connected to the remaining USB port. The USB storage 47 capable of storing the scan data is not a device other than a storage device such as a keyboard, but is a storage device having a storage capacity capable of storing the scan data.

In S99, the CPU 12 makes an affirmative determination when the CPU 12 detects that the USB storage 47 capable of storing the scanned data is connected to the remaining USB port (S99: YES). In S99, the CPU 12 makes a negative determination when the USB storage 47 is not connected to the remaining USB port or when a device other than a storage device such as a keyboard is connected to the remaining port. When the CPU 12 makes an affirmative determination in S99 (S99: YES), the CPU 12 sets the usable USB port, i.e., the remaining USB port described above, to the USB port to be used in the Scan to USB function (S109). Then, the CPU 12 performs the Scan to USB function (S107).

On the other hand, when a negative determination is made in S99 (S99: NO), the CPU 12 displays the error screen 131 in S95 (see FIG. 17). In this manner, the CPU 12 can execute the Scan to USB process according to the setting of the particular storing function and the connection status of the USB storage 47.

It is noted that the MFP 1 is an example of an image forming apparatus. The CPU 12 is an example of a controller. The RAM 13 is an example of a storage device. The printing part 16 is an example of an image forming device. The touch panel 21 is an example of an authentication information receiving device. The network OF 24 is an example of a first interface. The front side USB OF 26, the rear side USB OF 27, the front side USB port 45 and the rear side USB port 46 are examples of second interfaces. The USB storage 47 is an example of a portable storage device. The print job 61 is an example of an image forming job. The image data 73 and 74 are examples of image forming data.

8. Effects

According to the embodiment described above, the following effects are obtained.

(1) The CPU 12 of the MFP 1 according to the above-described embodiment is configured to perform the following processes.

A. A process in S11 (an example of a receiving process) in which the CPU 12 receives an operation of enabling or disabling the particular storing function which is a function to store the image data 74 related to the print job 61 in the USB storage;

B. A process in S29 (an example of an enabling process) of enabling the particular storing function in response to the CPU 12 receiving the operation of enabling the particular storing function (S11: YES);

C. A process in S35 (an example of a disabling process) of disabling the particular storing function in response to the CPU 12 receiving the operation of disabling the particular storing function (S11: NO);

D. A process in S54 (an example of a first storing process) of storing the image data 47 related to the print job 61 in the USB storage 47 in response to receipt of the print job 61 (S43: YES) when the particular storing function has been enabled by the process in S29;

E. A process in S85 or S79 (an example of a first image forming process) of forming an image with the printing part 16 in accordance with the image data 74 stored in the USB storage 47 by the process in S54;

F. A process in S49 (an example of a second storing process) of storing the image data related to the print job 61 in the RAM 13 in response to the CPU 12 receiving the print job (S43: NO) when the particular storing function has been disabled by the process in S35;

G. A process in S79 (an example of a second image forming process) of forming an image with the printing part 16 in accordance with the image data 73 stored in the RAM 13 by the process in S49.

According to the above configuration, when receiving the operation of enabling the particular storing function, the CPU 12 stores the image data 74 related to the print job 61, which is received after enabling the function, in the USB storage 47. Then, the CPU 12 causes the printing part 16 to form an image in accordance with the image data 74 stored in the USB storage 47.

On the other hand, when receiving the operation of disabling the particular storing function, the CPU 12 stores the image data 73 related to the print job 61, which is received after disabling the function, in the RAM 13 provided to the MFP 1. As above, the user can switch whether the image data 74 is stored in the USB storage 47 or not by performing an operation of enabling or disabling the particular storing function.

(2) The MFP 1 is further provided with the touch panel 21 through which the CPU 12 receives the authentication information. The CPU 12 executes the processes of S85 and S79 in response to successful authentication (S61: YES) based on the authentication data (e.g., a user name and a password) received through the touch panel 21. According to the above configuration, the CPU 12 stores the image data 74 in the USB storage 47 and then executes the authentication using the touch panel 21. When the CPU 12 succeeds in authenticating, the CPU 12 performs the image formation in accordance with the stored image data 74. As a result, it is possible to suppress a case where printed matter on which the image is formed is delivered to a user other than the user who has requested the image formation.

(3) When the CPU 12 receives the operation to enable the particular storing function (S11: YES, S15: YES) while the image data 73 has been stored in the RAM 13 by the process in S49, the CPU 12 executes the process in S21 (an example of a first deletion process) in which the CPU 12 deletes the image data 73 stored in RAM 13.

According to the above configuration, when the particular storing function is enabled while the image data 73 for which the printing process in S79 has not been completed is stored in the RAM 13, the CPU 12 deletes the image data 73 from the RAM 13. Since the image data 73 in the RAM 13 is deleted, the CPU 12 does not need to manage the image data in the RAM 13 after the particular storing function is enabled, and the CPU 12 needs to manage only the image data 74 stored in the USB storage 47. Accordingly, a processing load to the CPU 12 regarding management of the image data 73 and 74 can be reduced.

(4) When the CPU 12 receives the operation of enabling the particular storing function (S11: YES), the CPU 12 executes the process in S27 (an example of a second deletion process) of deleting the data stored in the USB storage 47. According to the above configuration, as the CPU 12 deletes the data in the sub storage 47 before the CPU 12 enables the particular storing function and stores the image data 74 in the USB storage 47, a storage area for storing the image data 74 can be secured.

(5) When the CPU 12 receives the operation of disabling the particular storing function (S11: NO) in a state where the image data 74 is stored in the USB storage 47 in the process of S54, the CPU 12 executes the process in S34 (an example of a third deletion process) of deleting the image data 74 stored in the USB storage 47. According to the above configuration, when the particular storing function is disabled while the image data 74 for which the print process of S79 has not been completed is stored in the USB storage 47, the CPU 12 deletes the image data 74 from the USB storage 47. Since the image data 74 in the USB storage 47 is deleted, the CPU 12 does not need to manage the image data 74 in the USB storage 47 after disabling the particular storing function, and it is only necessary for the CPU 12 to manage the image data 73 stored in the RAM 13. Therefore, the processing load to the CPU 12 regarding management of the image data 73 and 74 can be reduced.

(6) It is noted that the CPU 12 encrypts the image data 74 in the process of S54 and stores it in the USB storage 47, while stores the image data 73 in the RAM 13 without encrypting the same in the process of S49. According to this configuration, by storing the image data 74 in the USB storage 47 in an encrypted manner, reading of the image data 74 stored in the USB storage 47 becomes difficult in a case, for example, where the USB storage 47 is removed from the MFP 1 and lost after the image data is stored. That is, the security of the image data 74 stored in the USB storage 47 can be enhanced. On the other hand, by not encrypting the image data 73 stored in the RAM 13, it is possible to reduce a processing load to the CPU 12 both in a process of storing the image data 73 into the RAM 13 and in a process of reading the image data 73 from the RAM 13.

(7) Further, in response to the CPU 12 receiving an operation of enabling the particular storing function (S11: YES), the CPU 12 newly generates (S30) a common key 78 (an example of an encryption key) used for encrypting the image data 74 in the process of S54. According to this configuration, it becomes difficult to read the image data 74 in comparison with a case where the same encryption key is used continuously, and leakage of information can be prevented.

(8) When the CPU 12 receives an operation of enabling the particular storing function (S11: YES), the CPU 12 executes the process of S26 (an example of a storage capacity determining process) for determining whether or not the storage capacity of the USB storage 47 is equal to or larger than the particular storage capacity. Further, when it is determined that the storage capacity of the USB storage 47 is less than the particular storage capacity as a result of the process in S26 (S26: NO), the CPU 12 executes the process in S28 (an example of a notification process) to notify an error without enabling the particular storing function.

In a case where the storage capacity of the USB storage 47 is small, when the data amount of the image data 74 to be stored in the USB storage 47 increases, there is a possibility that the image data 74 cannot be stored in the USB storage 47. On the other hand, when the storage capacity of the USB storage 47 is small, the number of times of writing or reading per unit storage area of the USB storage 47 increases, and the possibility of causing a disorder of the USB storage 47 increases. Therefore, prior to enabling the particular storing function, the CPU 12 determines whether or not the storage capacity of the USB storage 47 is equal to or greater than a particular storage capacity. When the storage capacity is less than the particular storage capacity, the CPU 12 notifies an error without enabling the particular storing function. As a result, the user is caused to recognize that there is not enough storage capacity to enable the particular storing function, and is prompted that appropriate measures (e.g., replacement of the USB storage 47) should be taken.

(9) As the second I/F, a USB OF configured to perform transmitting and/or receiving (i.e., at least one of transmitting and receiving) the image data 74 in accordance with the USB (Universal Serial Bus) standard may be employed. According to such a configuration, portable storage devices (e.g., a USB memory, a USB-connected hard disk drive and the like) that is widely and generally used can be employed as the storage device of the image data 74.

(10) As the image forming part, the printing part 16 configured to print an image based on the image data 73 and 74 may be employed. According to such a configuration, it is possible to configure an image forming apparatus in which the storage destination of the image data 73 and 74 relating to printing can be changed in accordance with the operation of enabling or disabling the particular storing function.

9. Modifications

It is noted that aspects of the present disclosures should not be limited to the above-mentioned embodiments, but various modifications and alterations can be made within scopes without departing from aspects of the present disclosures. For example, the image forming job stored in the storage device or the portable storage device should not necessarily be limited to the print job 61, but may be the scan job instructing execution of a scanning function, a facsimile job instructing execution of a facsimile function, or the like.

The condition triggering execution of the first image forming process in S85 and S79 should not be limited to the success of the login authentication. The CPU 12 may execute S85 or S79 in response to, for example, a particular button on the touch panel 21 being touched and execute printing in accordance with the image data 74 stored in the USB storage 47.

The method of login authentication according to the present disclosures should not be limited to the method using a password. An authentication method using, for example, an authentication card and wireless communication, or a biometric authentication method such as one using a fingerprint may be used. The MFP 1 may determine whether to allow logging based on data received from a mobile terminal. The user may enter usernames and/or password on the mobile terminal, and transmit them to the MFP 1, thereby the login operation being performed.

It is noted that the CPU 12 is configured to delete the image data 73 in the RAM 13 (S21) when the particular storing function is enabled. However, the CPU 12 may be configured no to delete the image data 73 in the RAM 13. Instead, the CPU 12 may be configured to move the image data 73 in the RAM 13 to the USB storage 47 and manage the image data 73 together with the image data 74.

In S27, the CPU 12 deletes the data in the USB storage 47 when the particular storing function is enabled. However, the data need not be deleted. It is noted that the CPU 12 may store the image data 74 and/or the list data 77 in a free space of the USB storage 47 with leaving the data stored in the USB storage 47 undeleted. Alternatively, the CPU 12 may move the data in the USB storage 47 to a location different from the USB storage 47.

In addition, the CPU 12 deletes the image data 74 in the USB storage 47 (S34) when the particular storing function is disabled. It is noted that such a configuration may be modified. That is, the CPU 12 may not delete the image data 74 but move the same from the USB storage to the RAM 13 and manage the image data 74 together with the image data 73.

It is noted that the CPU 12 may be configured to encrypt at least one of the image data 73 and the list data 76, which is to be stored in RAM 13, and/or configured not to encrypt at least one of the image data 74 and the list data 77, which is to be stored in the USB storage 47.

In the embodiment, the CPU 12 is configured to newly generate a common key 78 each time the particular storing function is enabled (S30). However, the CPU 12 may be configured not to generate a new common key 78 every time the particular storing function is enabled, but use the same common key 78. Alternatively, the CPU 12 may be configured to use one of a plurality of common keys 78 by rotating the same each time a particular storage function is enabled.

In the embodiment, when the storage capacity of the USB storage 47 is less than the particular storage capacity, the CPU 12 notifies an error without enabling the particular storing function (S28). The configuration may be modified such that the function may be enabled regardless of the storage capacity.

It is noted that the image forming part according to the aspects of the disclosures should not be limited to the printing part 16, but may be any other apparatuses configured to form images such as the image reading part 17 or the FAX OF 18.

Then MFP 1 may be configured to have only one USB port, or three or more USB ports. In this instance, in the process of S11, the CPU 12 may display selection buttons for selecting three or more USB ports on the setting window 81 shown in FIG. 3 to receive an operation to select one of the plurality of the USB ports.

Similarly, in the process of S103, the CPU 12 may display selection buttons for selecting three or more USB ports on the selection window 143 shown in FIG. 18 to receive an operation to select one of the plurality of the USB ports. Further, in the process of S99, the CPU 12 may sequentially determine whether or not the USB storage 47 is connected to a plurality of USB ports other than the USB ports used in the particular storing function.

Further, the CPU 12 may be configured to set a plurality of USB ports to be used in the particular storing function. In this case, the CPU 12 may determine, in the process of S22, whether the USB storages 47 are connected to all of the plurality of USB ports set to be used for the particular storage function. In such a case, the CPU 12 may be configured to make an affirmative determination (S22: YES) when the USB storage is connected to at least one of the plurality of USB ports.

In the above embodiment, the CPU 12 which is configured to execute a program indicated below as a controller. Aspects of the present disclosures do not need to be limited to such a configuration. For example, the controller may be configured by dedicated hardware such as an ASIC (Application Specific Integrated Circuit). Alternatively, the controller may be realized by, for example, processes performed by software and processes performed by hardware in combination.

In the above embodiment, the MFP 1 is employed as image forming device according to aspects of the present disclosures. However, the configuration according to aspects of the present disclosures should not be limited to the above-described one. The image forming apparatus according to the present disclosures may include, for example, a printer having only a printing function.

What is claimed is:

1. A printing apparatus, comprising:
   a print engine;
   a network interface;
   an authentication receiving part configured to receive authentication information;
   a connection interface configured to connect a connection device;
   a controller; and
   a storage,
   wherein the controller is configured to perform:
      setting whether to enable or disable a storing process of storing image data in the connection device connected to the connection interface when receiving the image data through the network interface;
      in a case where the storing process is enabled, storing the image data received through the network interface in the connection device connected to the connection interface when the image data is received through the network interface, and causing the print engine to form an image based on the image data stored in the connection device connected to the connection interface when executing a printing process of printing image data using the print engine after storing the image data in the connection device;

in a case where the storing process is disabled, storing the image data received through the network interface in the storage when the image data is received through the network interface, and causing the print engine to form an image based on the image data stored in the storage when executing a printing process after storing the image data in the storage;

in a case where the storing process is enabled when executing the printing process in response to authentication being successfully performed based on the authentication information received by the authentication receiving part, causing the print engine to form an image based on the image data stored in the connection device connected to the connection interface; and in a case where the storing process is disabled when executing the printing process in response to authentication being successfully performed based on the authentication information received by the authentication receiving part, causing the print engine to form an image based on the image data stored in the storage.

2. The printing apparatus according to claim 1, wherein the controller is configured to perform a first deleting process of deleting the image data stored in the storage when the controller receives, in a receiving process, an operation of enabling a particular storing function in a state where the image data has been stored, in a first storing process, in the storage.

3. The printing apparatus according to claim 1, wherein the controller is configured to perform a deleting process of deleting the image data stored in a portable storage device when the controller receives, in a receiving process, an operation of disabling a particular storing function in a state where the image data has been stored, in a second storing process, in the portable storage device.

4. The printing apparatus according to claim 1, wherein the controller is configured to:
store, in a first storing process, the image data in a portable storage device in an encrypted manner; and
store, in a second storing process, the image data in a non-encrypted manner.

5. The printing apparatus according to claim 1, wherein the controller is configured to newly generate an encryption key to be used, in a first storing process, to encrypt the image data in response to the controller receiving, in a receiving process, an operation of enabling a particular storing function.

6. The printing apparatus according to claim 1, wherein the controller is configured to perform:
a storage capacity determining process of determining whether or not a capacity of a portable storage device is equal to or more than a particular storage capacity when the controller receives, in a receiving process, an operation of enabling a particular storing function; and
a notifying process of notifying an error without enabling the particular storing function when, as a result of the storage capacity determining process, the storage capacity of the portable storage device is less than the particular storage capacity.

7. The printing apparatus according to claim 1, further comprising a scanner configured to scan an image to generate image data,
wherein the controller is configured to perform:
in a case where the storing process is enabled, storing the image data received through the network interface only in the connection device connected to the connection interface; and
in a case where the storing process is disabled, storing the image data received through the network interface in the storage, and storing image data read by the scanner in the connection device connected to the connection interface when communicating with the connection device.

8. The printing apparatus according to claim 1, further comprising a multiple number of the connection interfaces, wherein the controller is configured to perform:
receiving, from one of a web server and a user interface, an operation to select a particular interface from among the multiple number of the connection interfaces, and setting the selected particular interface as the connection interface through which data is stored in the connection device; and
storing image data received through the network interface in the connection device connected to the selected particular interface set as the connection interface through which data is stored in the connection device.

9. The printing apparatus according to claim 1, wherein the connection device is a portable storage.

10. The printing apparatus according to claim 1, wherein the connection interface is an USB interface configured to perform communication in accordance with a Universal Serial Bus standard.

11. The printing apparatus according to claim 10, wherein the connection device is a USB memory.

* * * * *